US008127346B2

(12) United States Patent
Kulakowski et al.

(10) Patent No.: US 8,127,346 B2
(45) Date of Patent: Feb. 28, 2012

(54) NETWORK SECURITY SYSTEM AND METHOD

(75) Inventors: Robert T. Kulakowski, Rancho Santa Fe, CA (US); Donovan Steve White, Poway, CA (US)

(73) Assignee: Verimatrix, Inc., San Diego, CA (US)

( * ) Notice: Subject to any disclaimer, the term of this patent is extended or adjusted under 35 U.S.C. 154(b) by 71 days.

(21) Appl. No.: 12/826,501

(22) Filed: Jun. 29, 2010

(65) Prior Publication Data

US 2010/0268771 A1    Oct. 21, 2010

Related U.S. Application Data

(63) Continuation of application No. 11/625,044, filed on Jan. 19, 2007, now abandoned.

(60) Provisional application No. 60/760,475, filed on Jan. 20, 2006.

(51) Int. Cl.
*H04L 29/06* (2006.01)

(52) U.S. Cl. ............ 726/10; 726/2; 726/3; 726/5; 726/9

(58) Field of Classification Search .............. 726/10, 726/2, 3, 5, 9
See application file for complete search history.

(56) References Cited

U.S. PATENT DOCUMENTS

| | | | | |
|---|---|---|---|---|
| 5,560,008 | A * | 9/1996 | Johnson et al. ................ | 726/5 |
| 5,708,716 | A | 1/1998 | Tisdale et al. | |
| 6,069,877 | A | 5/2000 | Yang | |
| 6,466,780 | B1 | 10/2002 | Geiselman et al. | |
| 6,612,488 | B2 | 9/2003 | Suzuki | |
| 7,146,159 | B1 | 12/2006 | Zhu | |
| 7,363,056 | B2 | 4/2008 | Faisy | |
| 7,546,353 | B2 | 6/2009 | Hesselink et al. | |
| 2003/0163693 | A1* | 8/2003 | Medvinsky ................ | 713/169 |
| 2004/0015692 | A1 | 1/2004 | Green et al. | |
| 2005/0255830 | A1 | 11/2005 | Thorson et al. | |
| 2006/0010199 | A1* | 1/2006 | Brailean et al. ............... | 709/204 |
| 2006/0167643 | A1* | 7/2006 | Casto et al. .................... | 702/85 |
| 2007/0022469 | A1 | 1/2007 | Cooper et al. | |
| 2007/0033419 | A1 | 2/2007 | Kocher et al. | |

OTHER PUBLICATIONS

Form/ISA/210—International Search Report for PCT/US07/60744, mailed Feb. 14, 2008, 2 pages.
Form PCT/ISA/237—Written Opinion of the International Searching Authority for PCT/US07/60744, mailed Feb. 14, 2008, 5 pages.
International Preliminary Report on Patentability for PCT/US07/60744, dated Jul. 31, 2008, 7 pages.

* cited by examiner

*Primary Examiner* — Edan Orgad
*Assistant Examiner* — Bradley Holder
(74) *Attorney, Agent, or Firm* — Procopio, Cory, Hargreaves & Savitch LLP

(57) ABSTRACT

In a security system for network communications with client devices, each client device has a communication module for communicating with at least one server over a network, a data storage module for storing one or more covert data values of one or more operational events at the client device, and a covert identifier generating module which creates at least one covert identifier based on the stored covert data values. The covert identifier is provided in one or more network messages to the server, or otherwise sent to the service provider, and may be provided in response to a specific request received over the network, or routinely in one or more messages normally involved in network communications. The server compares covert identifiers received from client devices having the same client identifier in order to detect possible clones.

37 Claims, 10 Drawing Sheets

NETWORK SECURITY SYSTEM AND METHOD

RELATED APPLICATION

The present application is a continuation of pending U.S. patent application Ser. No. 11/625,044 filed Jan. 19, 2007, which claims the benefit of U.S. provisional patent application No. 60/760,475 filed Jan. 20, 2006, and the contents of each of the aforementioned applications are incorporated herein by reference in their entirety.

BACKGROUND

1. Field of the Invention

The present invention relates to network communications between a server and client device, and is particularly concerned with a network security system and method for detecting clones of true or properly registered client devices attempting to steal services without payment or otherwise mimic a real client device.

2. Related Art

In a distributed computing environment, pirates attempt to steal services by creating multiple clients with credentials identical to a valid client or authorized subscriber, thereby allowing non-paying subscribers to share (steal) the services of a paying authorized subscriber. Since the credentials appear valid, the server sends broadcast keys or the like to such clones, enabling non-authorized subscribers to view broadcasts, engage in two-way communications, or the like. Such cloning techniques are a significant problem to network providers. Pirates also attempt to duplicate or clone client devices such as smart cards which are used by authorized individuals as credit or automated teller machine (ATM) cards, in mobile phones, for high security identification and access-control cards, public transport cards, and other purposes. Cloning of smart cards also causes significant problems to providers of such services as well as the authorized card users.

Therefore, what is needed is a system and method that reduces or overcomes these significant problems found in the conventional systems as described above.

SUMMARY

Embodiments described herein provide for the addition of covert security data to normal messages between a client device and server, so that a server can determine if more than one client device communicating with the network has the same registered credentials or client identifier (client ID), indicating the presence of one or more cloned client devices.

According to one aspect, a security method for detecting cloned client devices is provided, which comprises receiving a message from a client device at a server, the message containing a covert identifier derived from one or more operational events at the client device, determining whether the covert identifier matches a covert identifier for the client device stored at the server, and reporting detection of a cloned client device if the covert identifiers do not match.

The covert identifier stored at the server may be based on one or more covert data items generated by the server or by the client device, or both, and may have been received in a previous message which purports to be from the same client device. If the messages originate with different client devices, such as a real client device and a cloned client device, the covert identifiers do not match, since the timing and values of operational events at one client device are not identical to those at another client device. The covert identifier may be a value generated by or based upon one or more operational events, for example the time of occurrence of an event or the number of times a particular event has occurred at the client device, or may be a transformed version of one or more covert data values using a hashing function or the like.

The client device may be any type of computing device capable of receiving and/or sending data over a network, such as set top boxes (STBs), personal computers, game consoles, cellular phones, personal digital assistants (PDAs), video equipment, smart cards, and the like. The covert identifier generated for the client device may comprise one or more covert data values collected and stored by a client device, or a transformed version of such covert data values, and may be based on any operational characteristic or event of a client device which changes over time and which can be stored by the client device, or by the client device and sewer. The covert identifier may be a token or value provided by the server, or may be a combination of client and server generated covert data values. An operational characteristic of a client device as referenced herein is an event which occurs at or in connection with the client device and which is unique to that particular client device, such as a time at which a predetermined operational event occurs, for example sending or receiving a predetermined message at the client device or server, a firmware update, a delay time between sending a message to the network and receiving a response from the network, the time when the nth network packet is received at the client device, the number of times a certain operational event occurs, a token sent to the client device from the server, a count of Entitlement Control Message (ECM) packets received, a channel the client device was tuned to at a predetermined time, number of channel changes in a predetermined time, a register value contained on a chip in a client device, and so on. In the case of a smart card, the operational characteristic used to generate covert data may be a time of first use of the smart card, the microsecond time when the smartcard was used for a certain operation, the total number of data bytes processed by the smartcard at a certain time or captured at a certain event such as a broadcasted event trigger, or any other operational data, count, or event occurring during the use of the smartcard, for example. In the case of a mobile phone, call logs at the phone may be used to generate the covert identifier, by processing the call log with a hashing function to generate an identifier which is unique to that phone. The operational characteristic is one which is created by operation of a particular client device and is therefore not easily hacked or duplicated by a cloned client device, for example the microsecond time of day that an event occurred or a trigger occurred, or new data was captured. Covert identifiers may be updated periodically using new operational events to provide the covert data values, to further reduce the risk of successful hacking.

Some examples of possible covert data values which may be used to create a covert identifier unique to a client device are the last time a particular type of message was sent from or received by the client device, the number of times a particular event has occurred, such as number of items purchased, number of transient key updates received, number of times a certain type of data message or network packet was received, or number of times a client device has performed a certain event, the internet protocol (IP) address used by the Dynamic Host Configuration Protocol (DHCP) server when used in the system, values obtained from other network devices such as cable modem or signal strength, value of a client data parameter after a predetermined number of events has occurred, and the like. A covert data value may comprise data received in a message from the server and used in a subsequent message to the server. This value may be updated by the server at each subsequent communication. In this way, the server recognizes that there is a potential clone device if a message is received which does not contain the updated covert data value, i.e. there is more than one client device with the same credentials on the system. More than one covert data value may be used for the covert identifier in each message for added security. In the case of a smart card, the covert identifier may be based on the time the card was used, the number of items purchased, or the like.

Event triggers may be used in some embodiments to update or modify covert data values or start a count or timer which results in updated covert data values used to generate a new covert identifier, or modifies the messaging protocol or data contained in a message between a client and server.

In another aspect, a security system for detecting cloned client devices is provided, which comprises a network server data storage module which stores a plurality of sets of client credentials or client identifiers (ID) for a plurality of authorized or real client devices and also stores covert identifiers based on operational characteristics of a client device which are received in messages from client devices, and a covert data processing module which compares a covert identifier in a message received from a client device with a previously stored covert identifier corresponding to the same client ID and which creates a clone detection report if the covert data identifiers do not match.

If the network is a two-way network, covert identifiers based on collected operational events are exchanged during normal network communications. If the network normally operates as a one-way network but has a return channel for certain client communications, predetermined covert data values based on usage of the device are collected and used to create covert identifiers stored by client devices. The covert identifiers are sent to the server in messages via the return channel when available, for example during a periodic renewal process. The server stores the first covert identifier for a certain subscriber. If a covert identifier is later received which purports to originate with the same client device, a clone detection report is issued by the server.

According to another aspect, a client device is provided which includes a covert data generating module for generating a covert identifier based on data generated by operation of the client device, and a covert data storage module for storing the covert identifier. If the client device is intended for use in a two way network environment, or in a one way network environment including a return channel for certain communications, the client device may also include a message generating module for generating messages containing the currently stored covert identifier. The covert identifier is subsequently sent to a network server over a network in a covert data field embedded in a message, or as a data value in response to a request from the server or any combination thereof. The message may be a type of message normally sent in two-way communications to a network, or in a message as part of a periodic renewal procedure or other standard message if the client device is normally involved only in one way communications with a network.

Where there is no return channel for a one way network service, the client device creates and stores a client identifier which may be updated periodically based on new events at the client device. The client device or a network server may include a service code generating module which generates a service code message at a client device at predetermined intervals. This message may ask subscribers to call a service center or send a short message service (SMS) text message via a mobile phone or internet connection to the service center, providing the subscriber identification and the currently stored covert identifier in the client device. Since the currently stored covert identifier is different for a real client device and a cloned client device, because they were operated differently, the service center can determine when two messages have been received with the same client or subscriber identification but with different covert identifiers. The service center can then take additional steps to determine which client device is associated with the authorized subscriber, and renews only that client device, cutting off service to any other client device using the same subscriber or client identification.

The covert identifier is generated by operational events occurring during actual operation of a client device. Because the operational events occur after manufacturing the client device and are based on how the subscribers use the client devices, the operational events are unique to a particular client device. These operational events are different even between cloned client devices, because cloned client devices do things differently after they are powered-on, and it is the difference in operation that is used to generate the covert identifier. The covert data therefore provides a unique identifier for a particular client device which is stored by the client device and subsequently used in messages to a server. Where the client device is normally used only in one way network communications, the unique covert identifier can be provided to the network in a periodic renewal procedure, or may be requested by a network server if cloning is suspected.

The covert data generating module may be incorporated in a central processing unit of the client device, which maybe embodied in a single chip (system on a chip or SOC) in some cases, such as in a smart card, cellular phone, or the like. The covert data storage module may also be incorporated in the central processing unit (CPU) or a separate data base associated with the central processing unit, or memory internal or external to the CPU.

A client device message format in one embodiment comprises a message identifier field, a covert data field, and at least one additional data field containing the message to be communicated to the server, such as a client identification field or key request, or as part of a message or message ID. The message type may be a logon message, a broadcast key request message, an e-commerce purchase message, a request to change channels, a subscription renewal message, or the like. If the message type is a logon message, the additional data fields contain the user name and password. The covert data field contains a covert identifier which may comprise one or more covert data values or items or a transformed version of such covert data values. The covert identifier can be used by the server on receipt of the message to determine whether more than one client device is using the same credentials. More than one message type may contain a covert identifier.

In one embodiment, the current covert identifier is sent to a server from a client device as part of normal messages such as logging onto a system, requesting a decryption key, performing an e-commerce transaction, or other messages and events that occur normally within a system. Covert data values used to create the covert identifier may be based on various events, and event triggers may be used to define events which trigger the updating or modification of a previously stored covert identifier. Covert identifiers added into the normal messaging between a client and server do not require added messages or added acknowledgements between the client and server, reducing the likelihood that a hacker can monitor the protocol and determine how to hack a system. As such, a hacker who is attempting to steal services by cloning subscriber credentials, for example, of a set top box (STB), also needs to have knowledge of the meaning of the covert identifier and the triggers that cause a change in the covert identifier to assure that authentic STBs and cloned STBs have the same covert identifier. More than one covert data value may be used to create covert identifiers, for example a client library of two or more covert data values may be used to create covert identifiers in each selected client message to a server. The client library of covert data values is periodically updated, making it more difficult to conceal cloned devices from a server. In alternative embodiments, the covert identifier can also be sent with separate messages between the client and server.

The security system may also include a renewal process designed to identify suspected clone devices. The renewal process may be initiated in response to a clone detection report generated by a network server, or may be carried out at periodic intervals or when clones are suspected for other reasons. The renewal process is designed to re-authorize only a single client device when several such devices are using the same credentials.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Figure 1:
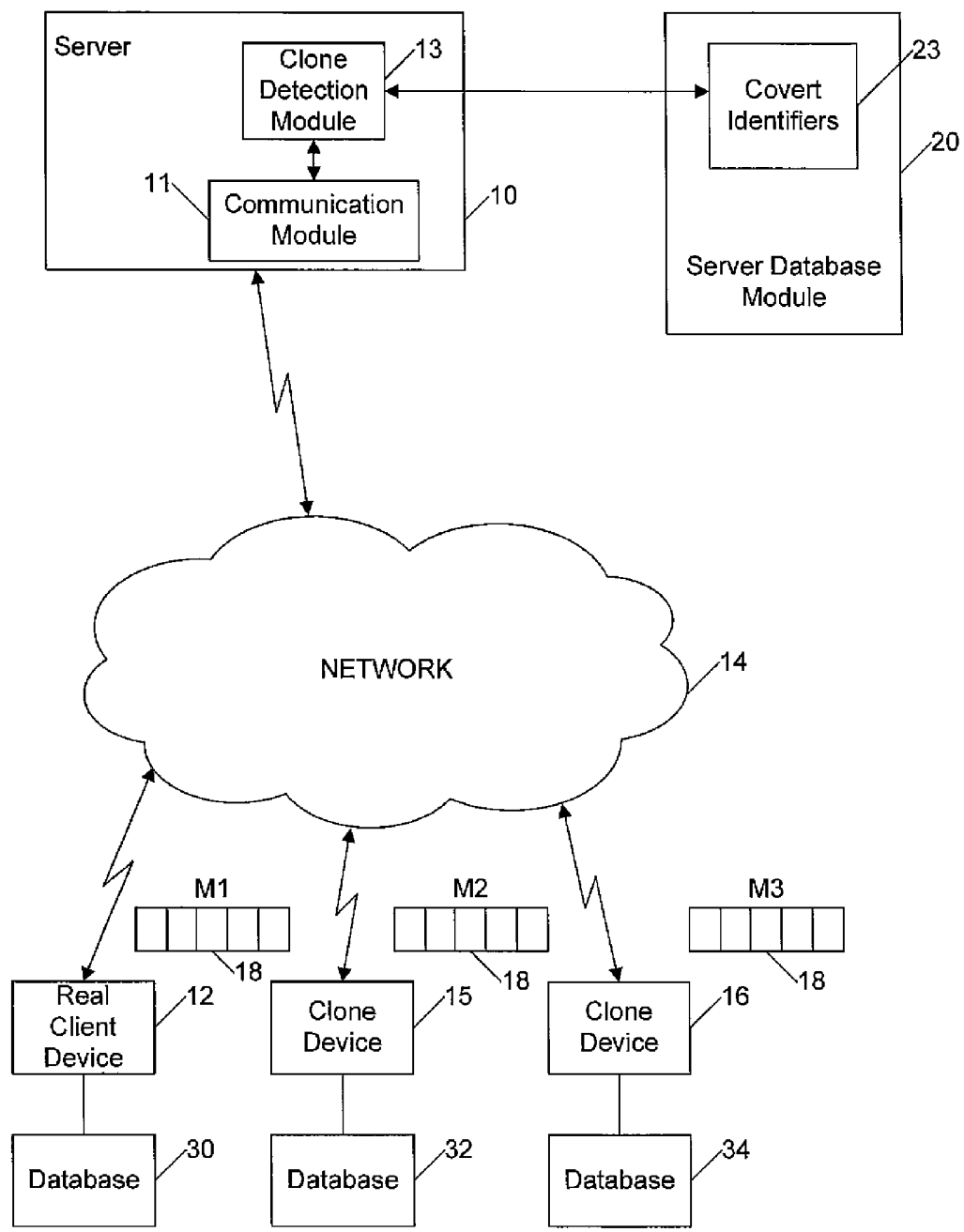
FIG. 1 is a block diagram illustrating a network with a real or authorized client device and some cloned client devices communicating with a server in one embodiment of a security system for detecting potential cloned client devices.

Certain embodiments as disclosed herein provide for detection of more than one client device using identical credentials. For example, one method and system as disclosed herein allows for detection of potential clone devices using a covert identifier based on values of operational events specific to a client device which is added into the normal messaging between a client device and a server.

After reading this description it will become apparent to one skilled in the art how to implement the invention in various alternative embodiments and alternative applications. However, although various embodiments of the present invention are described herein, it is understood that these embodiments are presented by way of example only, and not limitation. As such, this detailed description of various alternative embodiments should not be construed to limit the scope or breadth of the present invention as set forth in the appended claims.

In the following description, a client device may be any type of device capable of computing and receiving data from a network, such as a set top box (STB), personal computer, game console, cellular phone, personal digital assistant (PDA), personal media player, video equipment such as a digital video receiver (DVR), digital video disc (DVD) player (DVD), compact disc (CD) player, smart card, or the like. An authentic or real client device is the device which is properly registered with the server for receiving services over a network, or local services such as banking, purchases, and the like authorized by a network, as in the case of a smart card. A cloned client device is a device which has identical credentials to a real client device properly registered for service on the network, and which is used by an unauthorized or non-paying user in an attempt to obtain money or services without authorization. The terms "covert data", "covert data value" and "covert data item" are used to indicate unique data values based on operational characteristics of a client device, e.g. values created by operation of a particular client device or communication of that device with a server, or on tokens or values based on operation of a client device which are created by the server and embedded in messages to the client device. Such values are covert because their nature makes them difficult for hackers to detect and duplicate in cloned client devices, and because the data is generated after manufacturing. The term "covert identifier" indicates an identifier unique to a specific client device which is generated based on covert data values associated with operation of that device, and may comprise one or more actual covert data values in some embodiments, or may be a transformed version of such data values using a hash function or seeding a random number value or performing some other transform on the data. The term "event trigger" is used to indicate events that trigger the updating or modification of the covert identifier contained in a messaging protocol between a client device and server. An "event counter" counts events performed by a client device, and may be used as an event trigger when the number of counted events exceeds a threshold.

FIG. 1 is a block diagram of a network security system incorporating clone detection according to one embodiment in which a server 10 communicates with a real or authorized client device 12 over a network 14, and a number of cloned client devices 15, 16 using identical client credentials also send messages to the server 10 over network 14. One, two or more clone devices may attempt to use network services at any one time by posing as client device 12. Computing environment pirates often attempt to steal network and other services by creating multiple clients with identical credentials, thereby allowing non-paying subscribers to share or misappropriate the services of a paying authorized subscriber.

As illustrated in FIG. 1, the server 10 is linked to server data base (DB) 20 which has a data storage module 23 for storing covert identifiers which may be received from client devices in messages and/or generated by the server. As noted above, each covert identifier is based on operational events at a specific client device. Server 10 has a communication module 11 which controls network communications and a clone detection module 13 which compares covert identifiers in messages received from client devices with previously stored covert identifiers in module 21, as described in more detail below. Server 10 has additional standard server processing and control modules which are not illustrated.

In the system of FIG. 1, client device 12 sends a message M1 to the server 10, while clone devices 15, 16 send similar messages M2 and M3 to the server. These messages may be sent in any sequence, and the server is adapted to detect the presence of one or more potential clones regardless of the order of transmission of messages M1 to M3. Each message is adapted to include a covert identifier 18 embedded in a predetermined covert data field or portion of the message. Covert identifiers for client devices communicating with the server are associated with the client credentials for a client device and stored in covert data storage module 23 for comparison with future covert identifiers received from one or more client devices having the same credentials, as described in more detail below. Each true and cloned client device has a data base or memory storage (RAM, ROM, FLASH, EEPROM) or register storage 30, 32, 34, respectively, in which the covert data values are stored and updated at the predetermined event triggers. Although the data base is shown separate from the client device in FIG. 1, it may be housed in the client device or may be part of a central processing unit or system on a chip (SOC) in the client device, or device memory such as RAM memory, Flash memory, Secure Memory, and the like.

Figure 3:
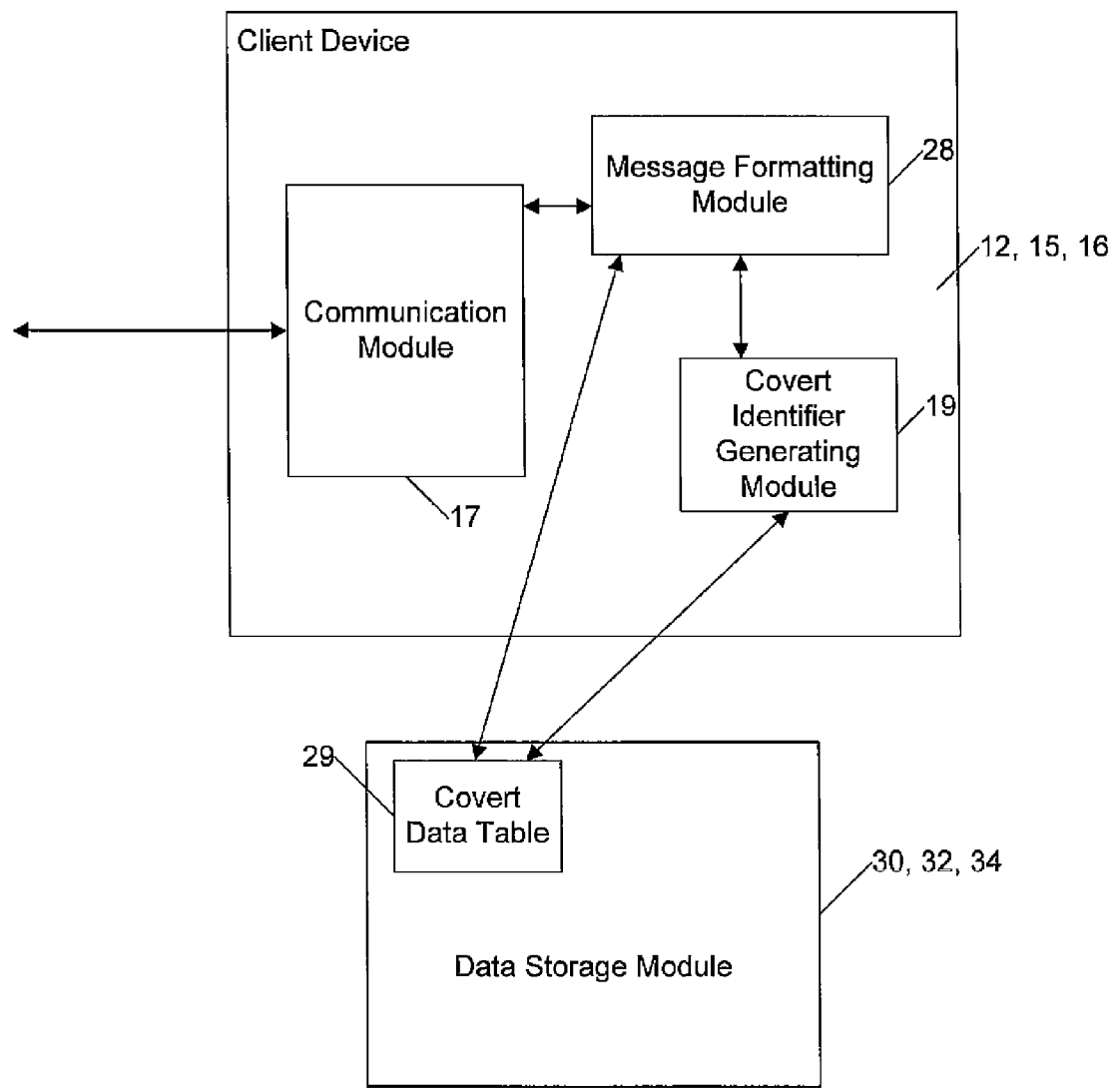
FIG. 3 is a block diagram illustrating a client device configured to insert a covert identifier in messages according to one embodiment.

A client device (real or cloned) 12, 15, or 16 is illustrated in more detail in FIG. 3. The client device may be any client device configured for communication over a network, such as a set top box, personal computer, game console, mobile phone, PDA, portable media player, DVD player, DVR, or a smart card, or the like. The client device has an associated data storage module 30, 32, 34 which is shown separately but may be incorporated in the same housing as other modules of the client device, or on the same chip as the other modules in some cases. The client device also has a communication module 17 for controlling network communications with server 10, a covert identifier generating module 19 for creating covert identifiers based on covert data values, event triggers or data received from the server, and a message formatting module 28. Client devices also include standard client device processing and control modules which are not illustrated in FIG. 3. The data storage module has a covert data table module 29 for storing the current set of covert data values, as described below. Where the covert identifier is a transformed version of the covert data values, the current covert identifier or matrix of covert data values or group of covert data values is also stored in module 29.

In one embodiment, message formatting module 28 is adapted to insert or embed the current covert identifier in one or more types of message sent to the server. In another embodiment in which the client device is used only to receive one way network communications and does not have access to a return channel to the network, message formatting module 28 is eliminated and the covert identifier generating module is configured to display the currently stored covert identifier in the form of a unique identification code to the user of the client device in connection with a periodic subscriber renewal process, as described in more detail below in connection with FIG. 9.

In one embodiment, the covert security data or identifier 18 is based on operational characteristics of the device from which the message is transmitted. Such characteristics are difficult or impossible to duplicate in a clone of the client device, since cloned client devices are not operated identically to authentic or real client devices and operational events such as messages, updates, and the like occur at different times in different devices. Obtaining micro-second identical events in real world client devices is nearly impossible. An operational characteristic of a client device is a value unique to that specific client device which is generated based on operation of the client device, such as a time at which a predetermined operational event occurs, for example sending or receiving a predetermined message at the client device or server, a firmware update, a delay time between sending a message to the network and receiving a response at the network, time when the nth network packet is received at the client device, the number of times a client device performs a certain operational event in a selected time period, a token sent to the client device from the server, a count of ECM packets received, a channel the client device was tuned to at a predetermined time, number of channel changes in a predetermined time, a register value contained on a chip in a client device at a certain time, and so on. It turns out that there are an unlimited number of operational data values that can be used to generated covert data values (or data values unique to the operation of a client) because the exact data value is not important but what is important is that the likelihood of the data value being different based on the operation of two identical devices is great. If two or more client devices using the same credentials are communicating over the network, such operational characteristics are not identical from one client device to the other, and are uniquely created by operation of a particular client device by a user. Such operational characteristics and the covert identifiers based on such characteristics therefore cannot be easily hacked or duplicated by a cloned client device. Operators of cloned client devices are unlikely to be able to obtain such characteristics of the true or authentic client device, and would not normally even be aware of which specific operational characteristics are used to create the covert identifier, and in one embodiment the covert data values change between different versions of the client software.

The server extracts the covert identifier received in a message from a device having certain credentials, and compares this identifier with those received in previous messages apparently from the same device. If there is no match, it is likely that one or more clones are being used, and the server can provide appropriate notification of likely clone detection to the system operator for further action. Since the server cannot determine which of several client devices with identical credentials sending messages are cloned devices, the requested service is provided to the devices, in addition to the clone detection notification to the operator.

In one embodiment, a covert identifier is transmitted in ordinary messages exchanged between the client and server. For example, assume that the client needs to log onto a system and a logon message is defined. The standard logon message includes a user name and password. In one embodiment, the logon message includes a covert identifier 18 in addition to the user name and password. When the client device attempts to logon to a system, the client device provides standard logon information such as user name and password and the covert identifier is embedded in the logon message (or any message or all messages) forming a logon command that includes the covert identifier as part of the standard logon message. The logon message contains the user name, password, and additional bytes of data containing the covert identifier. In one embodiment, the data items or values contained in the covert identifier or used to generate the covert identifier change at different times based on operating events within the client, or change based on time of day, or based on a time period elapsing after a certain event, so that the covert identifier can be updated either by changing covert data values at a particular time or by adding new covert data items to previous covert data items in essence increasing the number of covert data items for a particular client.

Any standard message exchange between a client device and server may be used for detecting clones, such as an initial logon message. A covert identifier can be combined with normal messages and/or events such as when a client logs into a system. In addition to information typically found in a logon such as the client user name and password, the covert identifier can be added to the logon message which is specific to operation of a certain client device, such as the last time the user logged into the network or the time difference between the current logon and the prior logon. Covert data can be applied to all messages in a communication system or only selected messages, such as the logon message or other types of messages.

Figure 2A:
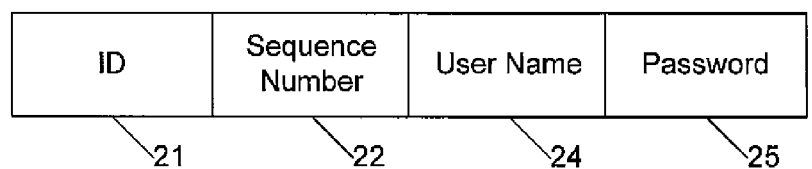
FIG. 2A is a diagram illustrating data fields in a prior art user logon message.

FIG. 2A illustrates a conventional log on message protocol as currently used. This message includes a message identifier field (ID) 21 which defines the message type from a group of messages supported on the system and which is typically unique for each message in a system. It may also include an optional sequence number field 22 which contains a unique number for each message of any type in the system, and is typically an incremental count that allows the system to eliminate message replay attacks by verifying the sequence number is new before processing the message. When the message is an initial logon message, it also has a user name field 24 which contains the user name for a user or client device on the system registered for the service or associated with a subscriber account with the service provider, and a password field 25 which contains the password for the user associated with an account or service. The password is provided when the user or subscriber first subscribes or registers with the system or service provider, and is verified by the server in subsequent requests for service by the user. Services can be accessed or the user can purchase items using the service only after the password is correctly provided in password protected systems. In addition, covert data can be used as part of password salting for each client with the server side being aware of the covert data used to salt the password or data, or the server side downloading the encryption key or salting key into the client. Such passwords are sometimes obtained by hackers and used in conjunction with clone devices in attempting to obtain services without payment.

Figure 2B:
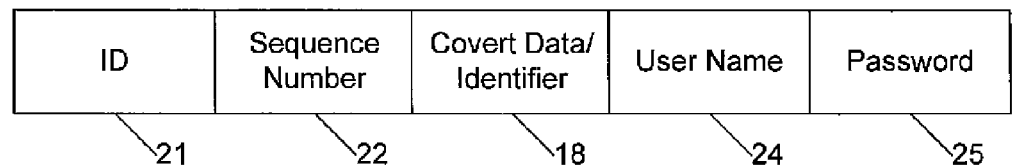
FIG. 2B is a diagram illustrating data fields in one embodiment of a user message containing a covert identifier used at the server in one embodiment of a system for detecting potential cloned client devices.

FIG. 2B illustrates an embodiment of a modified initial logon message which contains a covert identifier in covert data field 18 in the regular log on message structure. The ID field, sequence number field 22, user name 24, and password 25 are identical to the corresponding fields of FIG. 2A, but the message is modified to provide a covert identifier in a data field 18 between the fields 22 and 24. The covert data field 18 may be provided at other locations in the message in other embodiments, and may be provided in different types of messages such as request broadcast key messages, e-commerce purchase messages, change channel messages, and the like. The covert identifier may be provided in only one specific type of message between a device and server, or may be provided in each message sent by the device, or intermittently in various messages. Intermittent transmission of covert identifiers may make such identifiers harder to track by potential hackers. Because encrypted messaging is always more secure than unencrypted messaging between client and server, in one embodiment covert data is transmitted over an encrypted connection such as Internet Protocol Security (IPSec), or secure socket layer (SSL) or other form of encryption between client and server.

As illustrated in FIG. 1, each of the messages M1, M2 and M3 has a covert identifier in field 18, but the covert identifiers in messages M2 and M3 do not normally match that of message M1. This is because the covert identifiers in one embodiment are based on covert data values generated by operational characteristics or operational events of the client device, such as time of sending or receiving certain messages at the client device or server, number of times a certain type of data message or network package was received, and the like. The covert identifier may comprise different operationally generated covert data values contained in different regions of the covert data field, or may comprise a transformed version of such covert data values. Such values are extremely unlikely to be identical in cloned client devices to the covert data values at a real client device, since the operation of cloned client device does not normally match the operation of a client device or another cloned client device. For example, a first segment of the covert data field may contain the first power on time of a client device in microseconds. After a certain time period or number of events, a second segment of the covert data field may add a subsequent power on time for the device to the first power on time (e.g. T1, T2). Even though the server does not know whether the second power on time was added by the client device or a cloned client device, the original power on time T1 is extremely unlikely to be identical for both devices, and the second and subsequent covert data items added to the covert data exchanged between client and server are designed to be unique between clients, and because additional covert data items are generated during the continued operation of the client the likelihood of the covert data being identical is very low.

The server receives messages from authentic and/or cloned client devices and saves the most recent covert identifiers associated with client credentials of the authorized user in server covert data storage module 23. When a subsequent message is received which is apparently from a device associated with the same client credentials, the server compares the covert identifier with the previously stored covert identifier for that client. If no match is found in one or more of the covert identifiers, one of the devices communicating with the server is likely to be a clone device, and the server reports to an operator that a clone has been detected. The operator can then initiate procedures to determine which device is a valid or authorized client device and which device is a clone.

Figure 4:
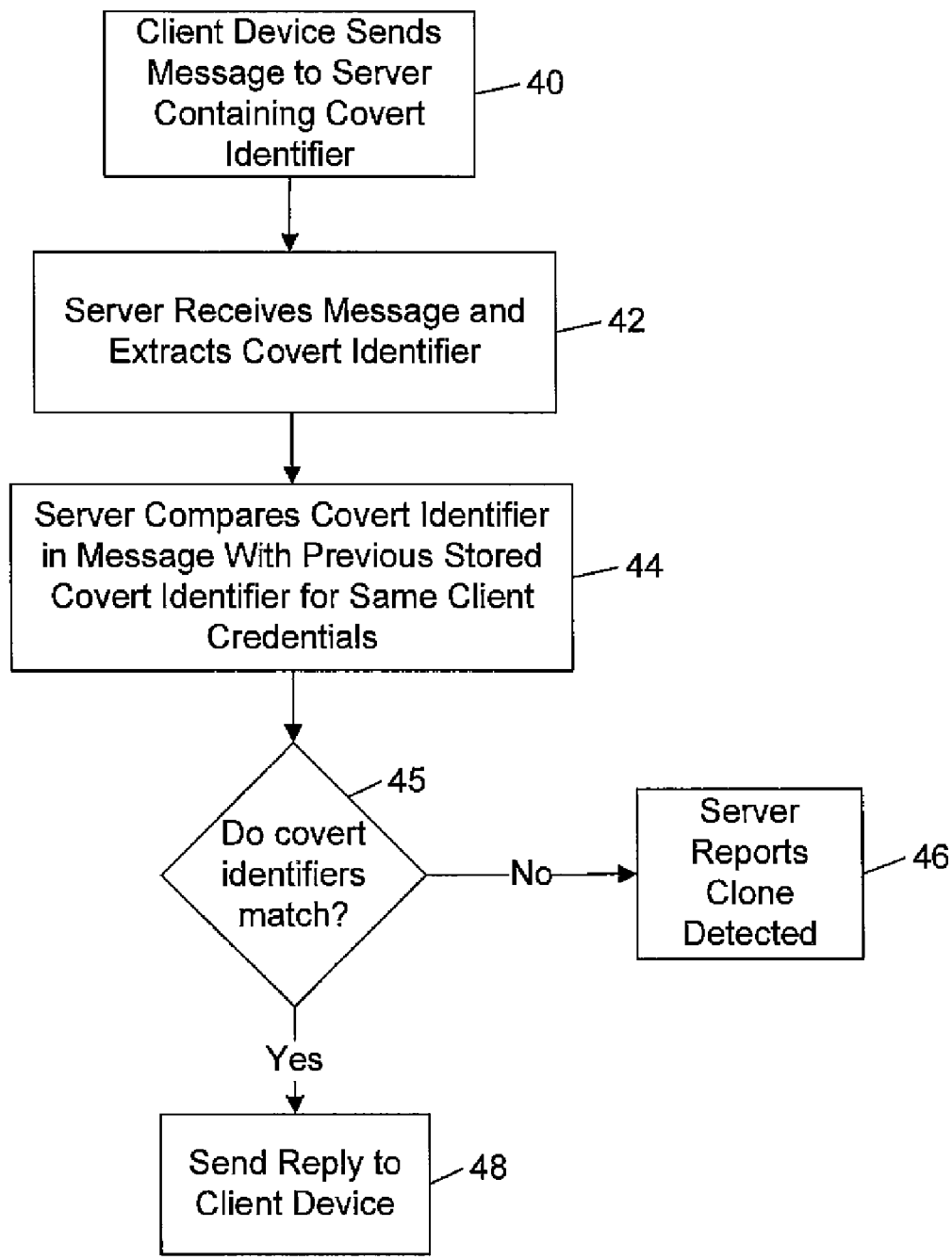
FIG. 4 is a flow diagram illustrating one embodiment of a method of detecting a cloned client device.

FIG. 4 is a flow diagram illustrating one embodiment of a method of using the system of FIGS. 1, 2B and 3 for detecting the presence of cloned client devices on a network. In step 40, a client device sends a message to the server containing a covert identifier in covert data field 18. The message may be of the format illustrated in FIG. 2B, for example, or may be any other type of standard network communication message with a covert identifier comprising one or more covert data values inserted at a selected data field in the message, or an identifier which is a transformed version of one or more covert data values. The server receives the message and extracts the covert identifier from the message (42), and then compares the covert identifier with the stored covert identifier corresponding to the client credentials associated with the registered client device from which the message appears to originate (step 44). The server determines whether there is a match (step 45) based on the comparison, i.e. determines whether there is a match between any part of a stored covert identifier and the covert identifier in the message. If a match is found, the server sends a message reply when appropriate to the client device (step 48), stores the new covert identifier, and the desired service or transaction takes place. If a match is not found, i.e. there is no match between any part of the covert identifiers, the server generates a report to the operator indicating that a potential clone has been detected (step 46), and an optional flag may be set in memory. If the covert identifier is a multiple digit code created by transforming cover data values, a match means that a received covert identifier is identical to a stored covert identifier. If the covert identifier is one or more covert data values based on ongoing events, the received covert identifier may match only part of the previously stored covert identifier, while it includes new covert data values added after the last message to the server. A match is still found if part of the received covert identifier matches the stored covert identifier, but a match is not found if there is no match in any part of the covert identifier.

The server may continue communications with the device which sent the message when a potential clone is detected, since it has not yet been determined whether or not that device is a cloned client device, i.e. the server does not have sufficient information to determine which of two client devices communicating with the server is a clone. In a last step, service may be discontinued to a device which is found to be a clone, or to all devices, leaving the authorized subscriber to contact the service provider to arrange for their service to be continued.

In one embodiment, covert data values on which the cover identifier is based may be generated by certain operational events at a client device. Some examples of possible covert data values generated by operational events are:

a) Number of times a client has performed a certain event such as requesting a key or initializing a session with a server, or performing an e-commerce transaction.
b) The number of prior items purchased by a subscriber.
c) The number of transient key updates received by a client.
d) The time of the last firmware update
e) The time of the last key request for the client
f) The time of the last message of a particular type, or the count of the number of times a certain message was received, or the delay between the current message and the prior message being received from the server.
g) The time when a certain type of message was received by the client
h) The time when a certain type of message was received from the client
i) A count of the number of times a certain type of data message or network packets was received with examples including video ECM (Entitlement Control Messages), count of different MPEG2 PID values, count of packets on a particular TCP IP port number, etc.
j) The time delay between a request message being sent to the network and the response being received back from the server.
k) The last time a multicast join was performed, or the value of the last multicast join.
l) The IP address provided by the Dynamic Host Configuration Protocol (DHCP) server when DHCP is used in the system.
m) The time remaining on a DHCP lease when DHCP is used in the system.
n) Values obtained from other network devices such as the ranging parameters for a cable modem or the signal strength of the network after 3 days of running a new client.
o) Data changing or a new message being generated after a certain period of times, for example the client device receiving a covert data value from the server that indicates to the client device in how many minutes the client device should contact the server.
p) The value of a client data parameter after a number of events such as the TV channel number when 57 channel changes occurred.
q) A new covert data value derived from a previously used covert data value processed with a function that creates the new covert data value.
r) A covert data value generated from data within a chip on the client device, or covert data value generated from processed or scaled data from a chip or hardware plug-in board or card or secure memory in the client device.
s) A covert data value such as a token or key received from the server that the client device retains and uses as part of a covert identifier containing one or more covert data values or items in subsequent messages with the server. Covert data received from the server can be transformed by the client device and the transformed version can be returned to the server as a covert identifier in subsequent messages. This allows the server to pass tokens or keys to the client in normal messages between the client and server as part of normal system message. The server supplied token used for client covert identifier can be sent in a separate message but the preferred message is to pass the covert data value from the server in a normal message.
t) Time of day when 12000th network packet was received.

Some of the above listed values may additionally or alternatively be used as event triggers or event counters which trigger the updating or modification of covert identifiers contained in a messaging protocol between a client device and a server. For example, an operational event may trigger a counter which counts subsequent operational events, such as the number of channel changes at a client device, for example, and records a covert data value when the user has changed channels a predetermined number of times. The covert data value may be the time of day when the predetermined count is reached, or the time it took before the predetermined count was reached. Other types of operational events may be counted in the same way to provide an event trigger, such as number of messages of a certain type sent or received by a client device, number of items purchased, or the like, or the number of events itself may be used directly as covert data values. Other possible event triggers may be the time when an operational event occurs, such as a firmware update. Such event triggers may be used to change a previous set of covert data values to a new set of covert data values based on different operational events, with the new covert data values then used to create the covert identifier. This makes it much more difficult for hackers to determine which particular operational events are used to generate the covert identifier.

Covert data 18 may be built in a table. One embodiment of a possible covert data table is shown in Table 1 below. In the table shown below the covert data table is built using two covert data items or values. One covert data item is the time of day (TOD) when the latest broadcast key request (BKEY) message was made and the other is the number of transient key updates obtained by a client device such as a set top box (STB) or other client device. Other covert data items based on operational characteristics may be used in alternative embodiments, and more than two covert data items may be used for added security. Initially both values in Table 1 are 0, and the initial covert identifier may be 0, 0. Table 1 below is only an example of two data values that can be together in one version of a client software release. It is envisioned that other covert data values may be used to create a covert identifier and that different data values may be used between different software versions. For example, in this example the number of transient key updates is being used, but in another version of the software the time of day (TOD) of the last transient key update could be used, or the number of seconds between the first and second transient key updates could be used.

TABLE 1

Covert Data Table

| Covert Data | Description |
| --- | --- |
| TOD of first BKEY request | Time Of Day that the first or nth Broadcast Key (BKEY) request was made by client device. Initially this is set to 0. |
| Number of Transient Key Updates | The number of times that the client device had its transient key updated. Initially this is set to 0. |

Figure 5A:
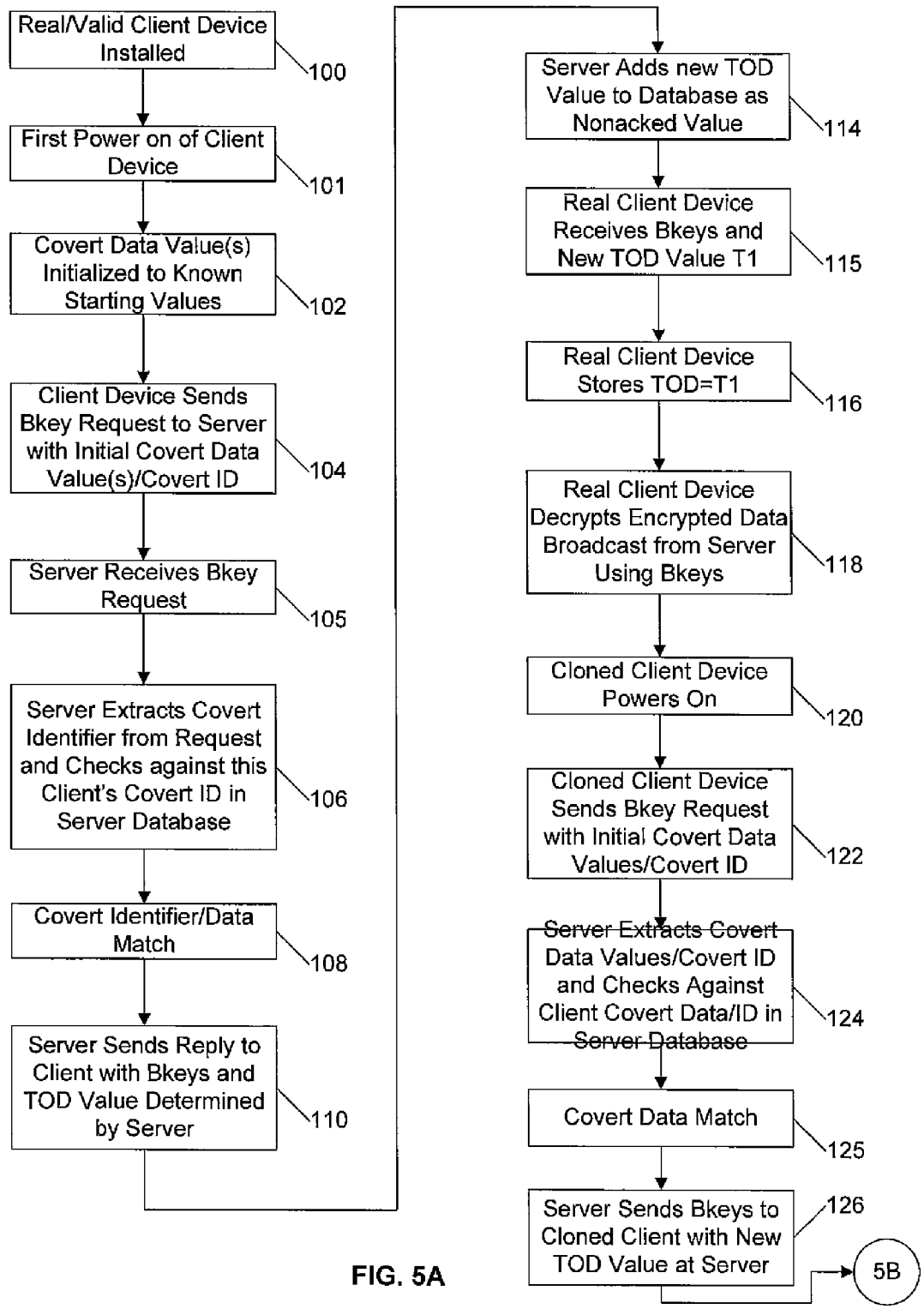
FIGS. 5A and 5B are flow diagrams illustrating one embodiment of the clone detecting method.
Figure 5B:
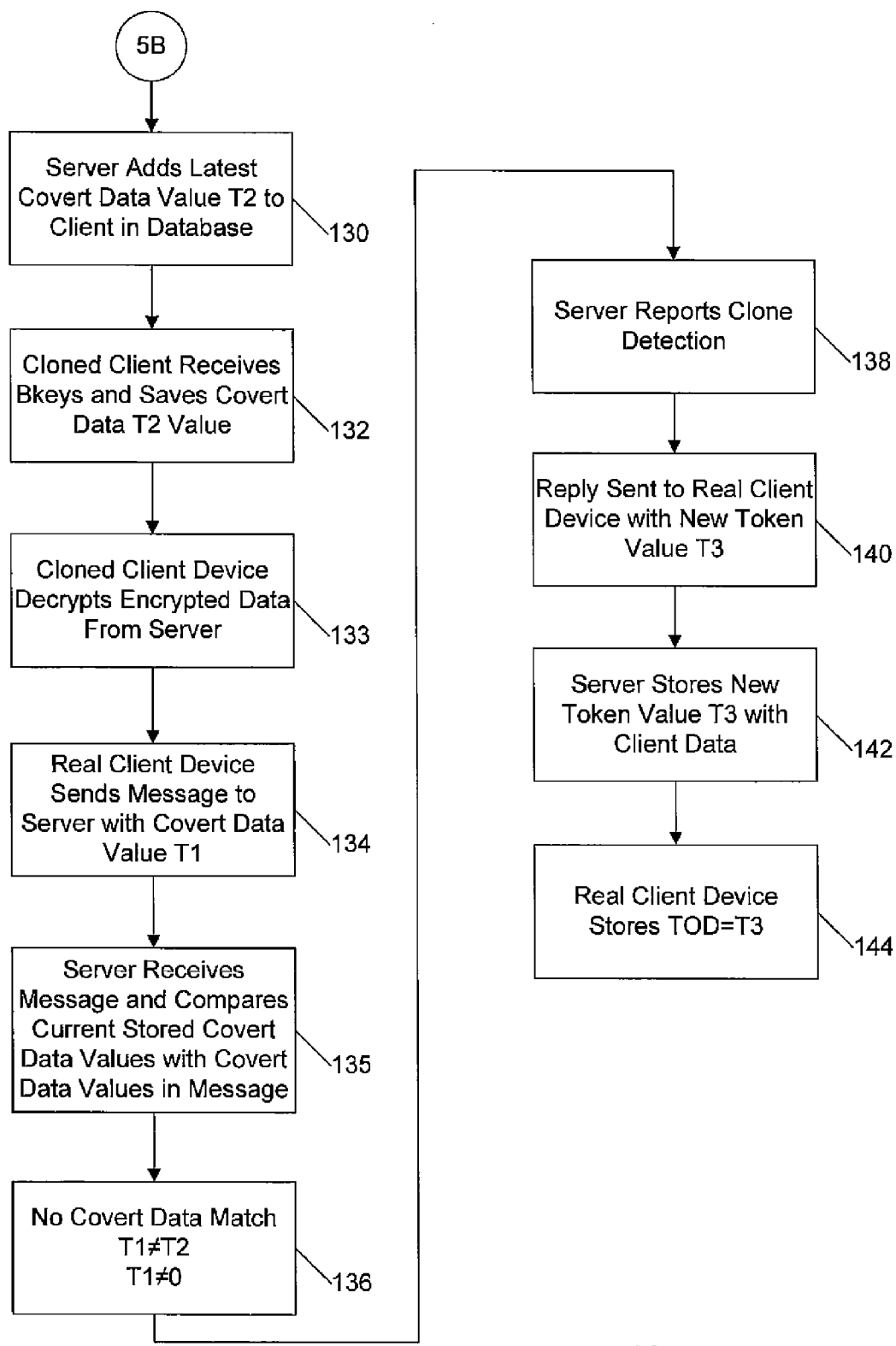

FIGS. 5A and 5B illustrate a flow diagram of the method steps in one example of an embodiment for detecting clone devices using covert data as in Table 1 above. Table 2 below illustrates one possible example of covert data values stored at both the server and client device or cloned client device at various steps in FIGS. 5A and 5B, and FIGS. 6A to 6F illustrate messages generated at various stages in the example of FIGS. 5A and 5B. In Table 2 and FIG. 5, the term "real client device" is used to designate the original or authentic client device associated with client device credentials registered at the server, while the term "cloned client device" designates a client device which is an exact copy of the real client device with the same credentials. In step 100 of FIG. 5A, a real or authentic client device is installed and registered as associated with a subscriber to the services provided by server 10, which saves the credentials of the subscriber client device in data base 20. At the first power on of the client device 14 (step 101), the covert identifier is initialized (step 102) to a known starting value at both the server data base and client device data base. The covert identifier in this case comprises a set of covert data values as indicated in Table 2 below. In this example, at least one of the covert data values used in the covert identifier is time of day (TOD) at which a broadcast key (BKEY) request was made by the client device, although any other covert data values may be used in place of the BKEY request TOD or in addition to the TOD in other embodiments.

The initial covert data values as stored in the server data base 20 before any BKEY request has been received are Acknowledged (Acked) TOD=0, Not Acknowledged (NotAcked) TOD=0, i.e. covert data or identifier for this client at the server is 0, 0, while the initial covert data value stored at the client device when it first powers on is TOD=0. Since this is the first power application after the client device was installed, the TOD event trigger for the broadcast key request is zero, because the client device has not yet requested broadcast keys. Any or all covert data can be set at an initial state such as zero on the first power up of a client device and/or at the server prior to receipt of a first message from a client device. In alternative embodiments, one or more non-zero covert data values may be generated during the registration process when a subscriber's client device is registered at the server, and used to create an initial covert identifier, or included in a covert identifier in addition to one or more covert data values which are initially set to zero.

In Table 2, the not acknowledged (NotAcked) value of a covert data item stored at the server is the last value issued to a client device (real or cloned) by a server which has not yet been acknowledged in a message from the client device. The NotAcked value is moved to the acknowledged (Acked) column of the value stored at the server when the client returns the NotAcked value or a value derived by the client device from the NotAcked value. The client may return the NotAcked value in the next message to the server in one embodiment, as illustrated in Table 2 and FIGS. 5 and 6. In an alternative embodiment (not illustrated), the client device sends a specific acknowledgement message to the server on receipt of the new NotAcked value, confirming that the NotAcked value has been successfully stored in the client device data base. At this point, the NotAcked value replaces the Acked value at the server. However, this alternative is more susceptible to hackers obtaining the covert data value. The method illustrated in FIGS. 5A and 5B, in which the only acknowledgement of the NotAcked value occurs when the next message of a designated type is sent to the server, is more covert.

Figure 6A:
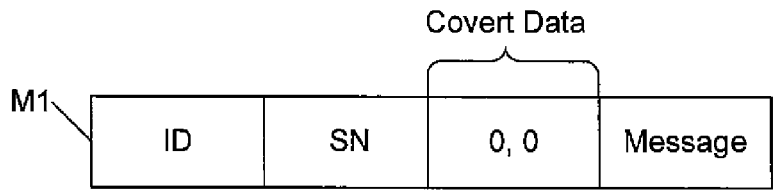
FIGS. 6A to 6F illustrate messages generated at various stages in the method of FIGS. 5A and 5B.

After initializing, the client device 14 sends a request for broadcast keys (BKEY request), to the server in step 104. In one embodiment, this request contains a covert identifier or covert security data 18. The covert identifier in the BKEY message in this case is as follows:
TOD Last BKEY request=0
Transient key updates=0.
In other words, the covert identifier in the BKEY request is 0, 0, and the format of this message M1 is illustrated in FIG. 6A.

Figure 6B:
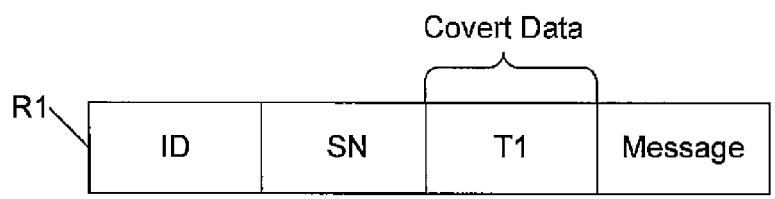

The server receives the BKEY request (step 105), and extracts the covert data values in the covert identifier from the request, then checks these values against the corresponding values stored at the sewer. This comparison is described below for the BKEY TOD covert data value only in a series of messages, but a similar comparison is carried out for other covert data values in a covert identifier, such as a value based on transient key updates. Since this is the first message from any client device using these client credentials, the BKEY TOD data matches (step 108), and the server returns the BKEYs to the client device (step 110) with a TOD value T1 determined by the server, i.e. the time of day of receipt at the server of the first BKEY request from this client. One embodiment of the format of the BKEY reply message R1 is illustrated in FIG. 6B, in which the new TOD value T1 is provided in a message field after the message ID and SN. In an alternative embodiment, the TOD value for the message may be read by the client device locally, instead of being received in the message from the server. The TOD value received from the sewer may be replaced with any type of data value or token sent from the server in other alternative embodiments.

In the example provided in Table 2 below, the TOD value T1 is 8437, and is added to the server data base as a NotAcked TOD in step 114 since no acknowledgement of receipt of this value has yet been received from the client device. As noted above, the client device may be programmed to send an acknowledgement of receipt of the TOD value T1 in an alternative embodiment, but in this embodiment no such acknowledgement is sent until the next BKEY message, so the TOD value T1 remains a NotAcked value until and unless it is acknowledged in a subsequent BKEY message, which is a more covert option. At this point, the TOD values in the client identifier saved at the server are Acked TOD=0, NotAcked TOD=T1 or 8437 in this example.

TABLE 2

Example of covert data values at various steps in FIG. 5

| Step | Server Actions | Server DB | Covert data values in client | Client/Clone Device Actions |
|---|---|---|---|---|
| 101, 102 | The initial covert data values for a client device are initialed to a known starting value. | AckedTOD = 0 NotAcked TOD = 0 | TOD = 0 | All covert data at an initial state (0, 0) |
| 112, 114 | Server returns BKEYs with a Time Of Day (TOD) value determined by the server. Server adds latest covert data value(s) to the server DB as unacknowledged value(s). DB contains last known good value (0 in this example) plus last unacknowledged value (current TOD = 8437) | AckedTOD = 0 NotAcked TOD = 8437. Note 8437 is a new TOD supplied by the server to the client. | | |
| 115, 116 | | | TOD now equals 8437. | Real client device saves TOD of last BKEY passed from server in BKEY delivery message in non-volatile memory |
| 122 | | AckedTOD = 0 NotAcked TOD = 8437 | TOD = 0 | Cloned client device covert data in BKEY Request is as follows: TOD Last BKEY request = 0, Transient key updates = 0 |
| 126, 130 | Server returns BKEYs with a new Time Of Day (TOD) value determined by the server. Server adds latest covert data value(s) to the server DB as unacknowledged value(s). DB contains last known good value (0 in this example) plus last unacknowledged value (current TOD) | AckedTOD = 0 NotAcked TOD = 9902. Note 9902 is a new TOD supplied by the server to the client, eliminating the non-Acked value of 8437 sent to the other STB requesting keys before the cloned STB | | |
| 132 | | | TOD in clone is 9902. | Cloned client device saves TOD received from server in BKEY delivery message. |
| 134 | | ACKedTOD = 0, notAcked TOD = 9902 | TOD in Real client device is 8437 | Real client sends renew BKEY message to server with Acked TOD of last BKEY request = 8437, and Transient Key Updates = 0 |
| 135 | Server receives BKEY request and checks TOD in DB against TOD in request. | ACKed TOD = 0, notAcked TOD = 9902 | Acked TOD = 8437 | |
| 140, 142 | Server updates notAcked TOD to 11305 and sends BKEYs and TOD to STB | ACKed TOD = 0 notAcked TOD = 11305 | TOD in real client device is 11305 | |

Figure 6C:
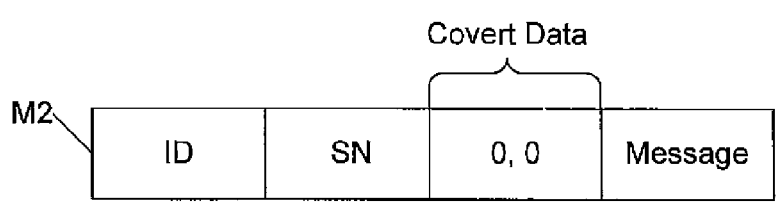
Figure 6D:
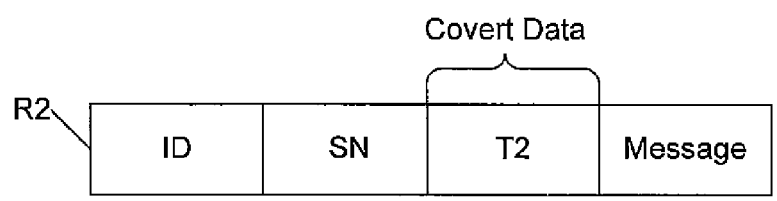
Figure 6E:
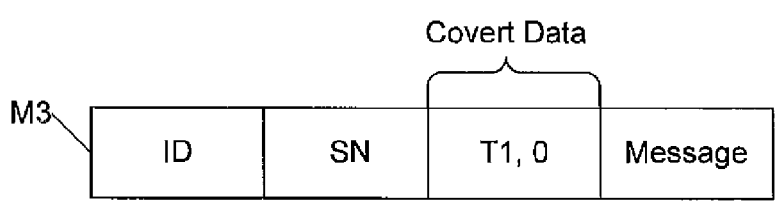
Figure 6F:
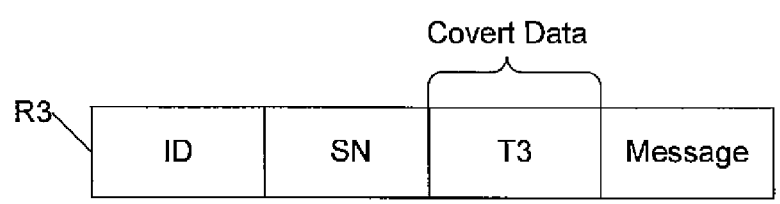

In step 115, the real client device receives the broadcast keys in the reply from the server, along with the new TOD value T1 (in this example 8437). The client device then stores the new TOD value (step 116), and decrypts encrypted data such as broadcast data from the server using the broadcast keys (step 118). In the illustrated example, a cloned client device powers up (120) sometime after the first broadcast keys are received by the real client device and before the real client device sends a subsequent broadcast key request to the server. This sequence of events does not happen in all cases, and is only one possible example of a sequence of real and cloned client device communications with the server. The cloned client device sends a broadcast key request to the server (122) containing a covert identifier comprising initial covert data values 0, 0, and a possible format of this message M2 is illustrated in FIG. 6C. The first message from any cloned client device in this embodiment contains the same covert identifier as the first message from the authentic or real client device, i.e. 0, 0. If this message is received by the server before the real client device has acknowledged a new TOD value from the server, the server still has no way of knowing that there is a cloned client device. If it is received after a new TOD value has been acknowledged by the same client device which initially requested BKEYs, the server knows that there are two client devices on the system using identical credentials, and generates a clone detection report as in FIG. 4.

In the example of FIGS. 5A and 5B, a cloned client device sends the first BKEY request to the server before the real client device has acknowledged receipt of a new TOD value from the server. On receipt of the BKEY request, the server extracts the covert data values 0, 0 and compares these values with the covert data values stored for the real client device having the same credentials (step 124). At this point, a covert data match is found (step 125), i.e. the received covert data is correct, since no specific acknowledgement of receipt of the NotAcked TOD T1 (e.g. 8437) has yet been received from the client device. In this particular example, the server does not know if the message containing the TOD was never received by the client device for some reason, such as network failure or the client device being turned off, and therefore does not assume that there is any cloned device present. The server data base contains the last known good value of the TOD (in this case 0) plus the last unacknowledged TOD value T1. Since the acknowledged value is a match, the server sends the broadcast keys to the cloned client device with a new TOD value T2 (step 126) in a reply message which may have the format illustrated in FIG. 6D in one embodiment. In the particular example provided in Table 2 above, the value T2 is 9902. At the same time, the NotAcked TOD at the server is changed to T2 (or 9902 in this example) in step 30, as illustrated in FIG. 5B, eliminating the previously stored NotAcked TOD T1 (or 8437 in the example of Table 2).

The cloned client receives the BKEY message and new TOD value T2 in the message from the server and saves the new TOD value T2 (step 132), and proceeds to decrypt data such as broadcast data received from the server (step 133), In the example illustrated in FIG. 5B, the next communication with the server after step 132 is a message sent from the real client device requesting broadcast keys (BKEY Request) since the real client device needs to renew its BKEYS (step 134). This message may have the format illustrated in FIG. 6E and contains a covert identifier comprising the covert data values currently stored at the real client device, specifically the TOD of the last BKEY request from this client device (T1 or 8437) and the transient key update number (0 in this example). In step 135, the server receives the new BKEY message from the real client device and compares the current stored Acked and NotAcked TOD values (specifically 0 and T2 or 9902) with the TOD value T1 or 8437 received in the covert identifier from the client device. Since the value T1 received from the client device is not equal to either the Acked value 0 stored at the server, or the NotAcked value T2 stored at the server (step 136), the server reports clone detection to the system operator for further action (step 138). Other server side processing can be applied at this point to detect clones. The server does not deny service since it cannot determine which of the two client devices sending messages is the real or authentic client device, and therefore sends BKEYs and a new TOD value T3 (11305 in the example of Table 2 above) to the real client device (step 140) in a reply message which may have the format illustrated in FIG. 6F. The server then stores the new TOD value T3 as a NotAcked value in the server data base (step 142), and the real client device also stores the new TOD T3.

The method of FIGS. 5A and 5B illustrates one possible method and sequence of events in which a cloned client device sends a message to a server after the real client device has received its first BKEYs from the server but before the real client device requests renewed BKEYs from the server. Such events may occur in different sequences depending on usage of true and cloned client devices, and more than two client devices with the same credentials may send messages to a server during the same time period. Cloned client devices may send messages to the server at any time and in any order relative to similar messages sent from a real client device. Regardless of the order, the server can determine the presence of a cloned client device because the covert data values in messages from either the real client device or one or more cloned client devices do not match one or more currently stored values at the server. For example, referring to FIG. 5A and step 122 of Table 2, if the real client device sends a subsequent BKEY request to the server at this stage, before any message is sent by a cloned client device, then the covert data values in the BKEY request are T1, 0 or 8437, 0 in the specific example of Table 2. The server receiving this message notes the match between the TOD value from the client device and the notAcked TOD saved in its data base, and changes the Acked TOD from 0 to T1. A new notAcked TOD T2 is then sent in the reply to the client device. A cloned client device subsequently communicating with the server sends a TOD=0, since it is the first communication from that device to the server. This TOD does not match either the Acked TOD (T1) or the Not Acked TOD (T2) stored at the server, and a clone detection report is generated by the server. A similar failure to match occurs at some point in any message sequence when more than one client device using the same credentials is communicating with a server, regardless of the order of communications between a server and a real client device and cloned client devices.

In the embodiment of FIGS. 5 and 6, and the specific example of this embodiment outlined in Table 2 above, the covert identifier in each message comprises two or more covert data values. However, the covert identifier may comprise a code generated based on such covert data values, for example by transforming the values using a hash function or the like. The message containing the covert identifier is a broadcast key request in the above embodiment, and the client device receives a broadcast from the server. The client device in this case is a media player such as a television set top box, personal computer, or any other client device capable of playing a broadcast such as television broadcast. The server may be one that distributes broadcast television channel decryption keys to clients. However, other types of client device and service providers can use the same covert data techniques in different types of messages. As noted above, covert data techniques of the above embodiments can be applied to any type of network service provider and to any type of client device linked to servers of the service provider, such as personal computers, cellular phones, personal digital assistants (PDAs), video equipment (TIVO, DVD, CD, etc.), and any other type of client device, and for any type of service such as on-line banking, e-commerce, data logging, message communications systems, etc. In the above embodiment, broadcast television channel decryption keys (BKEYS) are the keys necessary to decrypt encrypted broadcast TV channels as is typically used for premium televisions channels such as Home Box Office (HBO) or the Movie Channel. Premium television channels are optional channels that a cable TV or internet protocol (IP) TV subscriber may elect to purchase. The techniques described herein are also applicable to any encryption techniques where keys are distributed to client devices to allow access to various types of network services, or can be used in different types of messages between a server and a client device in addition to, or instead of, decryption key request messages.

Because there is the possibility that a real client device does not receive a message from a server due to network failure or due to the client device being turned off before the message response is received, the embodiment of FIGS. 5A and 5B may include server side processing to reduce the number of false clone detection alerts generated, whereby a clone detection alert is an indication that a client has been detected with client credentials identical to another client. In one alternative embodiment, as mentioned above, an explicate client acknowledgement is sent from the client device each time a covert data item used in a covert identifier is updated, and the server coordinates the expected covert data item in the server database based on the acknowledgement from the client that a server supplied covert data item was successfully received and stored by the client. The use of a direct acknowledgement message between the client and server indicating that a covert data token from the server has been stored by the client, or that the client covert data item has been acknowledged by the server can improve the detection of clones but creates additional messages that are processed by the server and can be intercepted by hackers.

In one embodiment, the server sends unique covert data items or tokens to a client device for use in subsequent messages. Examples of data items or values that the server may send to the client device include temporary data values periodically changed by the server when the client and server communicate, temporary keys sent from client to server, and the like. In one embodiment, the server sends temporary or transient encryption/decryption keys to a client and the transient keys becomes part of the key ring used in encrypting messages between the client and server. The use of transient keys prevents cloned clients from communicating with the server because only one client contains the appropriate keys to achieve encrypted communications between a client and a server. The transient keys may be sent over a session base encrypted communications channel such as provided by SSL or provided by Diffie Hellman type key exchanges so network packets containing the updated transient keys supplied by the server cannot be decrypted by cloned devices obtaining the same transient key update messages. Such session based encryption may be used for any type of communications. In one embodiment, the server sends a token or tokens to the client device, which are stored by the client device and used in subsequent client-to-server messages. The server may provide a unique token at random times or at fixed intervals to a client device.

In the example of Table 2, two covert data values are shown. However, one, two or more covert data values may used with values that are uniquely provided by the server and/or values that are uniquely determined by the client based on operation of the client device. In one embodiment, covert data module 29 at the client device may include non-volatile memory, and parts or all of the covert data may be stored locally in the non-volatile memory (hard disk, Flash memory, or the like) on the client device. The power-on order of real and cloned client devices or the order in which they connect to a network, or the order they make a first connection with the server, is not important and the techniques described above do not require the client devices to power up in any order. Thus, the first client device to power up in FIGS. 5A and 5B may be a cloned client device rather than a real client device, and real and cloned client devices may communicate with the server in any order and at any times. Regardless of the message order, this embodiment enables the server to determine when there is more than one client device using the same client credentials when a message is received in which the covert data value does not match a covert data value at the server, indicating that a real client device has been cloned.

FIGS. 5A and 5B illustrates covert clone detection using a single covert data item being sent from the server to a client device in the form of the Time of Day (TOD) of the last request from a client device. In an alternative embodiment, one or more covert triggers may be used. A covert trigger is a trigger that takes place after a number of events occur and which responds by modifying the covert data used to create the covert identifier, or providing a new piece of covert data that can be tracked by the server. There are numerous possible covert triggers in the normal operation of a client device, and covert triggers or events can be based on multiple categories of events such as time (total number of hours client device has been active, random number of hours after client device was installed or updated, or the like), messages (total number of video entitlement control messages or ECMs received, total channel changes), or internal data processing (e.g. TOD when the $100,000^{th}$ video packet was decrypted). Other examples of a covert trigger include a trigger that occurs when a client device such as a set top box (STB) has switched channels 100 or 200 times, for example, or a trigger that occurs when a certain number of client events occur and the trigger saves the client time of day (or other parameter) when the trigger occurs. Another example is the actual value of the $15000^{th}$ ECM packet received, or the Time Of Day (TOD) when the $15000^{th}$ ECM packet was received or a hash of the two data values. Events which trigger creation of a covert data value occur at different rates in two client devices with identical credentials (authentic/real and cloned client devices), so that the authentic or real client device and cloned client devices have different covert data and therefore different covert identifiers. The covert identifiers are used on the server side to detect multiple clients running on a network.

In one embodiment, client libraries of saved covert values are periodically changed to save new or different covert data values which in turn are used to generate a covert identifier. In this way, hackers who may have obtained one client library do not know when a new event which creates a covert data value used in a covert identifier might occur after a client library has been updated. Hackers need to take all the cloned client devices off the network to avoid detection after a client library software update, in order to try to determine what covert triggers are programmed into the client library, when the triggers occur, and what covert data is stored in the client library in response to a trigger. Such updates may be generated by a server and may use secure processing capabilities contained within the client device. The client firmware download method for updating the client library may used digitally signed code images to allow the client to authenticate the download. The head-end software may have application programming interface (API) functions or a data carousel interface for downloading client software, In one embodiment, covert identifiers contain data that may be static for a number of requests and then the covert data used to generate the covert identifier changes based on a covert trigger, or the covert identifier for every message of a certain type changes, such as the Time of Day or TOD for the prior message request. Covert data used in a covert identifier can originate within the client device, or be sent from the server as part of the messaging, or may be a combination of client/server data. The covert identifier can include data that is processed by the client or server such as applying current covert data values to a mathematical transform or cryptographic hash.

In one embodiment, covert data values used in a covert identifier may also change based on the server responding to a request in one of a number of different ways. In one example, the first 10 broadcast key requests receive one value of covert data and subsequent requests beyond 10 receive a different response in which the covert data is changed or scrambled or both. Changes can occur on client or server side or both. The covert identifier is contained in a message blob or field as part of a normal message processed during normal system processing and the message blob may vary between two different code releases of the client software. In addition, the message blob may have meaningless random data applied as a data whitener. In one embodiment, the data blob has three to five covert data values and the covert data values change based on different events or triggers occurring at different times.

In the embodiment described above in connection with FIGS. 5 and 6, a covert identifier based on time of day of a message is provided in broadcast key request messages or the like. Table 3 below illustrates an example of a transformed covert identifier created in client devices comprising mobile phones.

TABLE 3

Mobile phone covert identifiers

| | Real Phone | | | Clone 1 | | | Clone 2 | |
|---|---|---|---|---|---|---|---|---|
| | | | | Mobile ID (ESN) | | | | |
| | 100-4452 | | | 100-4452 | | | 100-4452 | |
| | | | | Call log | | | | |
| # | TOD | Dur. | # | TOD | Dur. | # | TOD | Dur. |
| N1 | 8:22 | 1:06 | N3 | 23:45 | 7:45 | N5 | 16:41 | 3:16 |
| N2 | 9:11 | 0:23 | N4 | 1:02 | 3:36 | N6 | 21:42 | 10:44 |
| Covert identifier | 391740 | | | 457492 | | | 112208 | |

In Table 3, one phone is real and the other two are clones, and each phone creates a covert identifier based on the operation of the phone. In the example above only the first two call entries are used to generate a unique covert identifier (ID). The call log of each phone is processed with a cryptographic hashing type function that generates a unique covert ID for each phone, resulting in an identifier that is unique to each phone even for perfectly cloned phones. Because the phones were cloned at manufacturing and each phone is used slightly differently over time, the covert identifiers are extremely difficult to duplicate, even if the owners of the phones tried to create identical call logs to generate identical covert identifiers. This is because it would be necessary to obtain microsecond identical events in order to create perfectly identical call logs, which may be impossible in real world devices.

The covert identifiers between client and server may be encrypted for added security, with the encryption keys being unique between clients, but the covert identifiers may be non-encrypted covert data values in other embodiments. In some embodiments, key-less security between a client and server may be involved, using only the covert data values or covert identifiers based on such values to identify client devices. However, the security is enhanced when the client/server communications are encrypted. Covert data or covert identifiers may be used in many ways to operationally identify a client without the need for a pair of encryption keys. In fact, the covert data scheme described above can be used in all message transactions without security specific messages being required in a system. This means that the covert data techniques described herein can be used to enhance the authentication of clients with and without security credentials such as X.509 certificates, encryption keys, and similar security specific keys. In one embodiment, all communications between a client and a server or between two computer devices are enhanced by the techniques described herein in situations where an encryption specific key is not required. Embodiments can apply to all types of software and firmware running in a system including application software, system middleware, billing software, any type of e-commerce transaction, any type of client/server communications, and any type of messaging between a client and a server or where a client needs to be identified.

In one embodiment, covert security data may be used to provide key-less security in systems which do not use security or encryption for communications between client devices and web sites or servers, as well as allowing for cloned client device detection. This embodiment is illustrated in the flow diagram of FIG. 7. In a first step 150, a client device contacts a web site or server to register for service. During registration, the client device sends an initial covert identifier to the server that uniquely identifies the client device (step 152). The covert identifier in this embodiment comprises a series of covert data values, but may comprise a transformed version of such values in other embodiments. The initial covert data values used in the covert identifier can be any client device specific data, including the covert data described herein, which is difficult to clone. When registering, the client can send somewhat difficult to clone client information as the covert identifier, such as central processing unit (CPU) serial number if available, disk drive volume ID, or other hardware specific information. The registration process itself may create new covert data values at the server side or client side which is more difficult to clone, such as data from one or more registers in the CPU or computer hardware devices, the time delay in nano-seconds between a message sent and the response being received by the client, check sum or crc values of a portion of memory, and the like. The initial set or table of covert data is captured and stored by the client device and server during the registration process (step 154). At this point, the covert data is unique to the registered client device, and client-server communications proceed using the covert identifier based on this data to validate the client device (step 155). In this case, the method for detecting cloned client devices is as illustrated in FIG. 4. If the server receives a communication which purports to be from the registered client device but does not have covert data values matching the initial covert data values stored at the server for that client device, a cloned device detection report is generated by the server.

Since hackers may be able to hack into the system and obtain the initial set of covert data values, or the covert identifier based on that data where it is transformed, new covert data is created based on operational characteristics as the client device continues to run (step 156). The new covert data is added to the initial set of covert data values in subsequent communications between the server and client device (step 158), with the new covert data values added to the previously stored covert data values for that client device (step 160) at both the server and client device. The new covert data may be created via timed events or counted events adding additional covert data created after registration to identify the client. Optionally, the server can create and deliver covert data to the client device at various times during the message providing the client device with additional covert data that is unique for this client device. New covert data continues to be added as the client device continues to run, so that there is no static set of covert data used for any extended period of time, making hacking and cloning much more difficult. At any stage, if the covert data received in a message from a purported real client device does not match the current set of covert data stored for that client device at the server, a clone detection report is generated.

Figure 7:
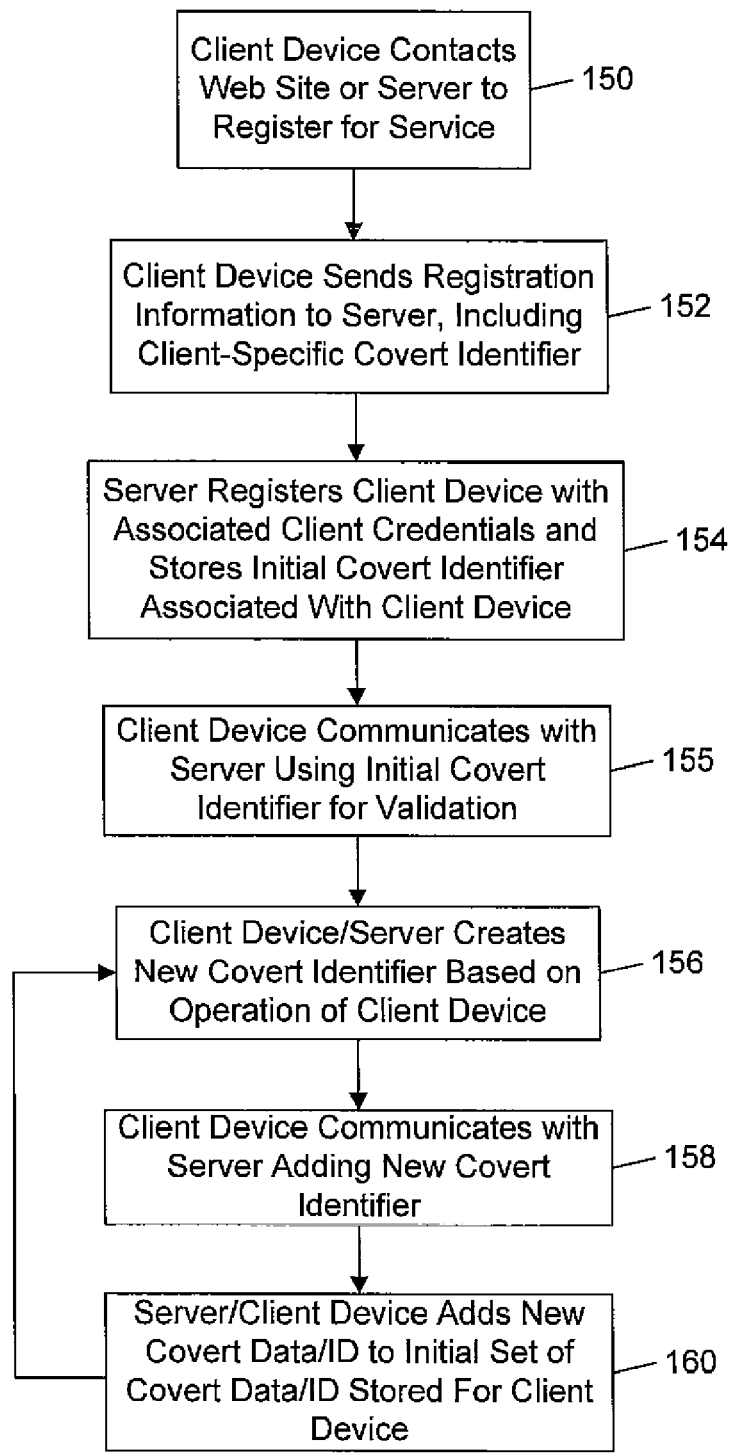
FIG. 7 is a flow diagram illustrating an embodiment of a method for inserting covert identifiers in messages between a client device and a server.

The method of FIG. 7 allows systems without security to create client unique identifiers based on covert data which cannot easily be hacked. For certain applications, the covert data techniques alone may provide adequate security, or the covert data techniques may be added to systems where the client/server messaging is secured using best-of-breed encryptions techniques enhanced with the covert data methods described herein, for example as described in connection with FIGS. 5 and 6 and in Table 2.

function, or seeding a random number value or performing a transform on the data value used as part of the covert data scheme.

TABLE 4

Get Key Message (GKM) and Covert Data over time

| Message Fields | GKM Message after Power on reset | GKM Message after 2 days | GKM Message after Counter 1 trigger | GKM Message after 1 week | GKM Message after 9 days | GKM Message after 2 weeks | GKM Msg after 3 weeks |
|---|---|---|---|---|---|---|---|
| GKM Message ID | 1 | 1 | 1 | 1 | 1 | 1 | 1 |
| Covert Data Item 1 | 0 | 0 | 0 | 0 | 0 | 31 | 31 |
| Covert Data Item 2 | 0 | 0 | 0 | 0 | 88359 | 88359 | 88359 |
| Covert Data Item 3 | 0 | 0 | 7190 | 7190 | SQR | SQR | SQR |

The covert data techniques described above may be used to enhance security when encryption keys are also used to encrypt messages between computer devices or keys are used to securely identify computers on a network. When a cloned client device is created, the cloned device has the identical keys of an authorized, authentic or real client device and can decrypt all messages being sent between the authorized authentic real client device and the server. However, operationally the real client device and the cloned client device perform certain functions differently over time, or have different operational counter values (number of ECM processed, time of day when 10th channel change occurred, and the like), so that the covert data generated by the real client device and the cloned client device differs, as explained above.

In many cases the actual value of the covert data is not important but what is important is that the operational behavior of a client device such as a set top box is different under normal operating conditions when compared to a cloned copy of the authentic client device. This means that that covert data values differ from client-to-client even when client devices have cloned client credentials identical to the real client device. In some embodiments, these operational differences are used to detect covert data values or covert identifiers based on such values that differ between an authentic client device and a cloned client device, and one embodiment of such a method is explained above in conjunction with FIGS. 5 and 6 and Table 2. In addition, the covert data values may be "counter values" which are weighted with a scaling factor requiring that the client device operate for a period of time before a value changes, thus providing data values that remain fixed at a single value for days, weeks, or months of operation. In one embodiment, one or more covert data values are utilized as a covert identifier in the messaging between client device and server. In one embodiment, more than one covert data value is used with different thresholds or triggers that result in the various covert data values changing at different rates. Table 4 below shows an example of three covert data values or items in a message called "Get Key Message" and the changes in the covert data items over time.

The embodiment of FIGS. 5A and 5B and Table 2 used a Broadcast Key or BKEY request for sending covert data values, and the same techniques described below in Table 4 for the Get Key Message can be used on the Broadcast Key or BKEY request example or any other messages used between a client device and server. Also note that the covert data items or values can originate on either the client device, or the server, or both and that covert data values can be the results obtained by processing a data value such as by using a hash The above example in Table 4 shows how three covert data values or items 1, 2, 3 in a Get Key Message (GKM) change over time. The GKM Message ID shown in the above table as a value of '1' identifies the message as being a Get Key Message. It is envisioned that, after each firmware revision, the covert identifier being sent as part of the client/server communications for a particular function such as a get key request (or any other event such as an e-commerce transaction or other transaction) contains different covert data items than the prior firmware release, making prior firmware hacks useless on the system. In the above example, the covert data items are different operational values generated at the client device or server, and may be any of the possible covert data items or values described above, or any other unique data derived from operation of a client device. If the server receives a GKM message at any time which does not match the current GKM message stored for the particular client device, it generates a cloned client device detection report.

In the above example, the Message ID for the Get Key Message does not need to change and is considered a static Message ID value to indicate one of a number of message types for communications between the client and server. However, the Message IDs can change between different client firmware versions, forcing would be hackers to have to reverse engineer the new Message IDs when a client firmware update is achieved. A firmware revision number may be contained in the message ID to allow the server to work with different client firmware versions.

In one embodiment, the covert data items gathered for various firmware releases differs between the different versions. Table 5 below shows an embodiment of possible covert data fields for three different firmware releases. This table shows the contents of three covert data fields for three different firmware releases named release 1.0, 1.1, and 1.2, with the various releases occurring over a period of one year, for example. The covert identifiers in messages between client device and server, or server and client device, or both, consist of three covert data items, with the nature of the covert data items being dependent on the current firmware release used. The table is read by reading down each column. The three covert data items for release 1.0 of the firmware are the 4th message token from the server, the scaled ECM packet count, and the time of day for the third message of a particular type received. In release 1.1, these items change to a scaled count of the total number of hours the client device has been running, a token received from the server after the $6^{th}$ message of a particular type with the server, and the time of day when the $10,000^{th}$ message of a particular type was received by the client device. In release 1.2, all three covert data items are again changed, with covert data item 2 changed to zero, and the other covert data items changed to time of day when the 150$^{th}$ message of a particular type was received, and the value of the channel number that the client device was tuned to at 8:37 pm on the day the new firmware was installed.

TABLE 5

Example of covert data values in different firmware releases

| Covert Data Item number in message | Value of covert data in release 1.0 | Value of covert data in release 1.1 | Value of covert data in release 1.2 |
|---|---|---|---|
| 1 | Token received from server after 4$^{th}$ message with server | Scaled count of the total number of hours client device has been running | Time of day when the 150$^{th}$ message of a particular type was received |
| 2 | Scaled count of ECM packets received | Token received from server after 6$^{th}$ message with server | Always set to 0 and never changes |
| 3 | Time of day when 3$^{rd}$ message of a particular type was received | Time of day when the 10,000$^{th}$ message of a particular type was received | The value of the channel number that the client was tuned to at 8:37 pm |

In one embodiment the covert data item or items used for any single firmware release can also change at predetermined times or in response to predetermined triggers. For example, say that a certain revision of code is released in the month of March and loaded onto the client device. For the first two months after the revision is loaded, covert data item 2 is the time of day the firmware was updated. Then, after two more months, covert data item 2 changes to a data value provided by the server. Then, after four months of operation of this firmware release, the data item 2 changes to the register value contained in a chip on the client device at the four month anniversary of loading the revision. In this embodiment, the value of a covert data item changed three times during the first four months of operation, so that hackers have more difficulty in successfully running clones of the client device. When the value of pre-stored covert data items change at a particular epoch, the server is aware of the epoch and adjusts its database appropriately. For example, say that after 90 days of operation the client library is designed to generate an entirely new covert data table or matrix, then the server is aware that after 90 days of use the client is reporting new covert data. In fact, even synchronizing the clones to flush their old covert data tables and refresh to new data at the same time presents hackers with logistical problems, especially when the hacker may not be expecting the covert data values to be changed.

There are many different possible covert data items and covert data triggers generated by the client device operation, the server communicating with the client device, or both, which may be used to generate client identifiers added to messages in the embodiments described above. One or more covert data items may be a token or a time provided by the server to the client device as part of the message response and the server provided data item is returned back to the server by the client device at a later time (maybe at the next request by a client device), for example as described above in connection with FIGS. 5 and 6 and Table 2. This allows the server to generate tokens used as covert data to identify clones. Covert data can also be a count of the number of messages processed by a client device or the number of messages written to a message log or message queue by the client device, or the value of the 10th API call to a client API function, or other similar event that would normally vary between client devices even with identical credentials.

In many cases the client device may not know or even care what the meaning of the covert data is, because it is information used on the server side to detect clones, or it was information provided by the server to detect clones. In one embodiment, some covert data values are generated based on one-time events such as what channel was the client device tuned to after a particular time period of operation of a new client device, e.g. 23:49:33 (hours:minute:seconds) of operation. Other covert data values may be generated using network or system operational values such as cable modem ranging parameters, DHCP lease times, and the like. Still other covert data values may be supplied by the server. Other covert data values may result from the messaging between a client device and a server, or other parameters normally found in the environment for the product. For examples, PCs can have different covert data values than wireless phones.

Figure 8:
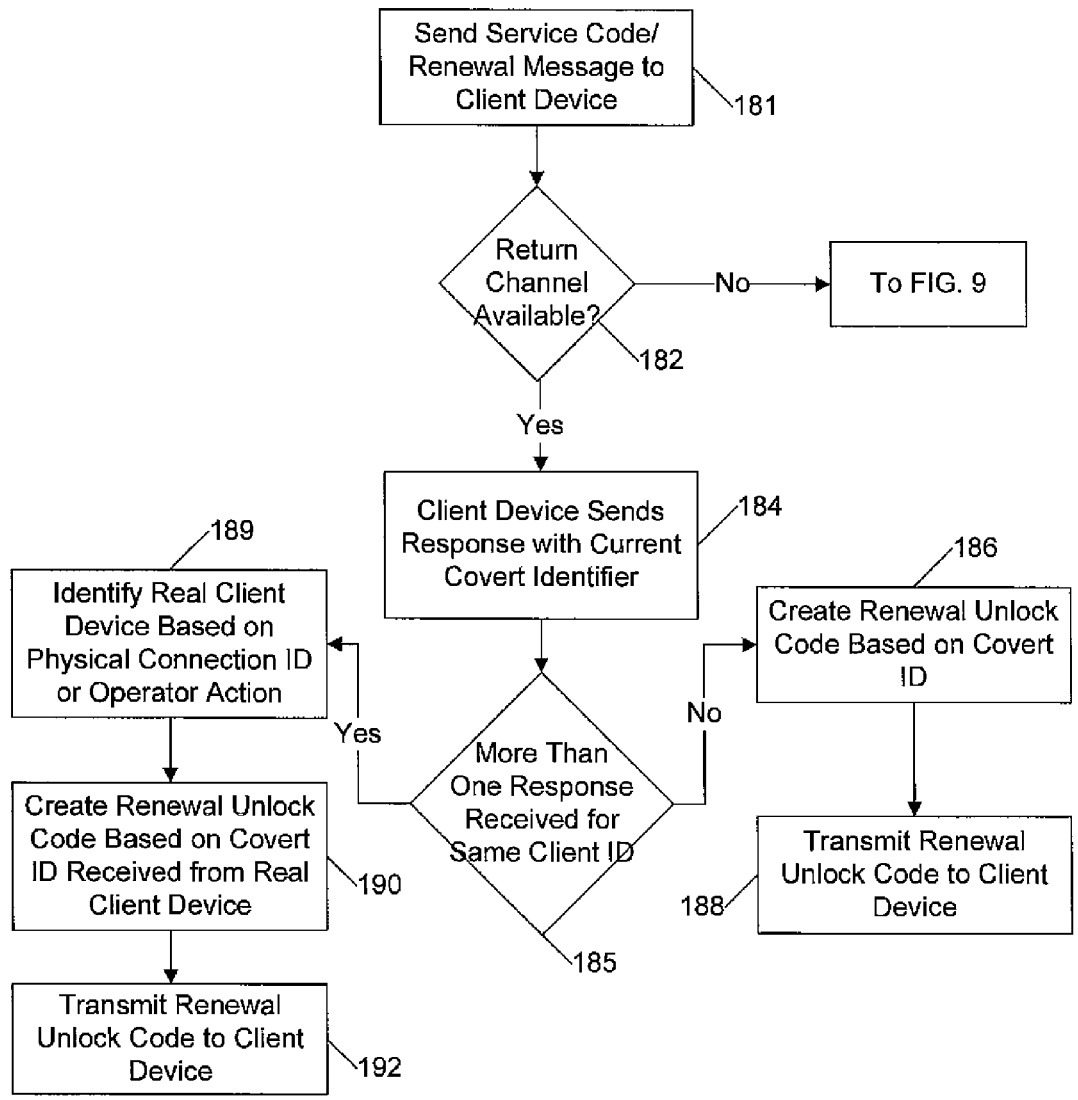
FIG. 8 is a flow diagram illustrating one embodiment of a service renewal method using covert identifiers.

A security system using covert data generated by client device operational events as described in the above embodiments may also be designed to include a subscriber entitlement renewal process, either when cloned or pirated client devices are detected by the system or suspected for other reasons, or at predetermined intervals regardless of suspected cloned client devices. FIG. 8 illustrates an embodiment of the renewal process for a two way network or a one way network with a return channel. Any form of persistent or non-persistent (sporadically available) return channel such as an occasional dial-up modem connection or a return channel formed when a cellular phone is connected to a client device such as a STB can be used for renewal as in FIG. 8. A similar process may also be used on a one way network without a return channel, and one embodiment of such a process is illustrated in the flow diagram of FIG. 9.

Figure 9:
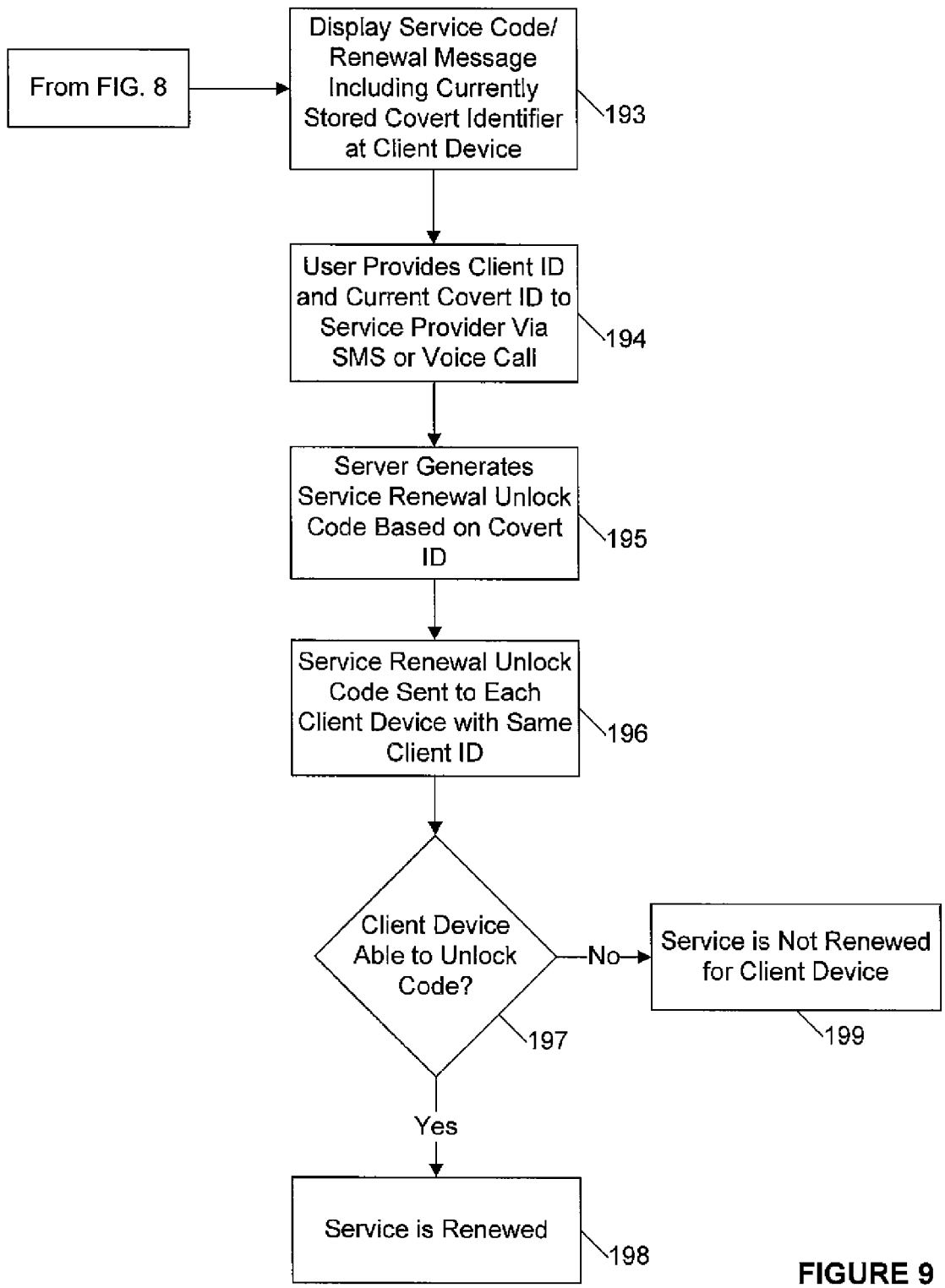
FIG. 9 is a flow diagram illustrating a modification of the method of FIG. 8 for use in a one way network environment having no return channel from a client device.

The process of FIG. 8 may be used in a renewal process in connection with two way networks or a one way network with a return channel. As illustrated in FIG. 8, a request for covert identifier is sent by a server over a network to individual clients (on 2 way networks) or all client devices (on one way network). Server sends a Renewal Message to Client (181). Assuming that a return channel is available (182), the client devices are programmed to respond by sending the current covert identifier back to the server (step 184). If a return channel is not available (i.e. the client device is operating on a one way network with no return channel), the procedure continues as illustrated in FIG. 9 and described in more detail below.

The covert data identifier sent back in step 184 for networks having a return channel is based on the covert data collected by a particular client device, which in turn is related to operational events at that client device. Since the covert identifier has just been updated in each client device, hackers have to re-start their hacking to find the covert identifier of the real client device immediately after receiving the update code in step 179, and attempt to duplicate that covert identifier in any clone device. Such hacking attempts are unlikely to be successful in time for the covert identifier to be duplicated before the response containing the covert identifier for each client device is sent back automatically from each client device in step 184. In one embodiment, the covert data identifier is an eight digit code generated from collected covert data values, and contains no subscriber related behavioral information or privacy related information. However, other codes based on covert data values may be generated in alternative embodiments. The server then determines whether more than one response has been received with the same client identifier but different covert data (step 185). If only one response is received, a renewal unlock code based on the covert identifier received from the client device is created by the server (step 186) and transmitted to the client device (step 188). If only one response is received, there are most likely no clones of the real client device on the network, and the real client device unlocks the renewal code and is renewed for service. However, if the real client device did not send a response for some reason, or cloned client devices did not send a response, more than one client device may still receive the renewal unlock code, since this code is broadcast to all client devices operating under the same client identifier or credentials. Only the client device with the same covert data identifier is able to unlock the renewal code and be renewed for services through the network. Any other client devices using the same client identifier are not be able to unlock the renewal code, and are blocked from receiving services. If the renewed client device is actually a clone, the real subscriber is blocked and calls the service provider to complain. In this case, the cloned device is blocked and the service with the real subscriber's client device is renewed. An optional step not shown in FIG. 8 and before step 181 would be to send a covert identifier update message to the client to have the client at that moment obtain yet another new covert data value and add it to the covert data table being returned in step 184. Each client device receiving the message then updates the covert identifier based on current operating characteristics of the particular device for the particular piece of covert data being captured.

If more than one client device response with a covert identifier has been received at step 185, the real client device is identified (step 189). Identification of the real client device at step 189 may comprise a network user authentication method as described in co-pending application Ser. No. 11/489,779 filed on Jul. 20, 2006, the contents of which are incorporated herein by reference. In this method, authorized subscribers are associated with the location of physical connections to the client device, and the network is probed in step 189 to determine which client device is at the correct physical network location for the authorized subscriber. When the correct or real client device is located, a renewal unlock code based on the covert data received from that client device is created in step 190, and is broadcast over the network in step 192 to all client devices having the same client on one-way networks and delivered uniquely to clients on two-way networks. Services are blocked to all such client devices, and only the real client device can unlock the renewal code and renew services.

If the service provider does not have authentication procedures based on physical location or physical connection identifiers for real client devices, the real client device may be located by other techniques, such as having a service operator call the subscriber and having the subscriber look up the covert identifier on the real client device and provide that identifier to the service provider in an SMS message or over the phone.

FIG. 9 illustrates steps in a periodic renewal process which may be used in connection with a covert data security system for client devices on one way networks having no return channel. This renewal process uses the same initial steps 179, 180 and 181 as illustrated in FIG. 8. However, in response to the service code renewal message, the central processor at the client device is programmed to display a service code or renewal message on the screen of the client device (step 193). This message includes the client identifier and the current covert identifier retrieved from the covert data storage module 29. The client identifier for the client device is identical for real client devices and cloned client devices, but the current covert identifier stored at the client device is different for each client device. The service code message includes a request that the user sends the two IDs to a telephone number displayed on the screen, which may be an 800 number for the service provider.

In step 194, the user of the client device provides the client identifier and covert data ID to the service provider as an SMS message to the telephone number on the screen, or alternatively via a voice telephone call to an operator at the service provider. At this stage, the service provider may be able to determine whether the sender of the message or the caller is the authorized subscriber, based on personal information or security information stored at the server, such as the telephone number of the authorized subscriber. If it is determined that the caller is the authorized subscriber, the server or service provider generates a renewal unlock code based on the unique covert data ID received from the user in step 195, and sends or broadcasts the renewal unlock code to all client devices on the network with the same client identifier (step 196). If the client device receiving the code is able to correctly process the unlock code (step 197), service is renewed for that device (198). If a client device receiving the code is unable to correctly process the unlock code, because the covert data stored at that client device does not match the covert data in the unlock code, service to that client device is blocked (step 199). If the system has incorrectly determined that a caller or sender of the requested message is the authorized subscriber, and the user is actually using a cloned device, so that the real client device is unable to process the renewal unlock code, the authorized user calls the service provider because their service has been blocked. A further renewal unlock code can then be generated based on the covert data at the real client device and broadcast to client devices so that the previously renewed device is blocked and the real client device is renewed for service.

The renewal processes described above in connection with FIGS. 8 and 9 may occur at predetermined intervals or when presence of one or more cloned client devices on a network is suspected, or both. The renewal process as described in FIGS. 8 and 9 can use any part of the covert data tables or pieces of the covert data tables to generate client device specific unlock codes whereby cloned clients with different covert data values are not be able to generate the appropriate keys to decrypt the unlock code. An example of such a client specific key management scheme is Diffie Hellman. Other types of key exchange mechanisms can be used. Using Diffie Hellman for example, covert data (any or all) is used as part of the seeding mechanism used to generate the client side unique key or part of the data used to provide server side compatible keys such that cloned clients with different covert data values are not able to generate the same unique keypair (Diffie Hellman keypair) between other cloned devices. Another way the renewal process can be achieved is by having the server use the covert data received for a client in a known way to seed or generate shared pairing keys in algorithms such as Diffie Hellman, and in essence, generating a unique key pair that can only be recreated by the client containing the appropriate covert data. Another optional method of performing client device renewal is to use part of the covert data as encryption/decryption key data because each client has unique covert data and the unique covert data is known to the server. Pieces or all of the covert data or hashed or transformed versions of the covert data can be applied to keys or seed data or factors used to generate encryption/decryption key data or used in generating shared keys with algorithms such as Diffie Hellman. It is also anticipated that the covert data can be used to scramble or transform key seed or key factor data being sent between the client and server, or server and client during the renewal process. For example, the covert data can be hashed by the client and then used as a key when encrypting data being sent to the server. And, because the server knows the covert data, the server can perform the same hash to generate the decryption key.

Again, using Diffie Hellman as an example, a covert data base Key Exchange can work as follows:
1. Alice chooses a random large integer X and sends Bob X=(g^x mod n) encrypted with Covert Data
2. Bob chooses a random large integer Y and sends Alice Y=(g^y mod n) encrypted with Covert Data
3. Alice decrypts Bob's encrypted Y and computes K=Y^x mod n
4. Bob decrypts Alice's encrypted X and computes K'=X^y mod n Following Diffie Hellman both K and K' are equal and the covert data was used as an encryption key for transferring data. Covert data can be used in more ways than only encryption key data and can be used as seed data for the random large integer calculations or hash applied to data and values used in algorithm calculations.

In the above embodiments, a unique covert identifier is generated based on operational events occurring during operation or use of a client device, based on how the client or subscriber uses the client device. These operational events are different between real client devices and cloned client devices because cloned client devices are operated by their users differently from users of real client devices or other cloned client devices. Such operations are extremely difficult to duplicate. The covert identifier may be used to detect cloned client devices and also in a periodic renewal process which may eliminate service to cloned client devices.

Those of skill will appreciate that the various illustrative logical blocks, modules, circuits, and algorithm steps described in connection with the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block or step is for ease of description. Specific functions or steps can be moved from one module or block without departing from the invention.

The various illustrative logical blocks and modules described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A method of detecting cloned client devices communicating over a network, comprising:
creating a dynamic covert identifier which identifies a client device, the dynamic covert identifier being derived from operational events at the client device which are at least substantially unique to the usage history of the client device;
receiving a first message from the client device at a server, the message containing the dynamic covert identifier;
storing a version of the dynamic covert identifier at the server together with having credentials registered at the server identifying the client device;
updating at least part of the previously stored dynamic covert identifier periodically at the client device based on event triggers to create an updated version of the dynamic covert identifier which includes at least one original part of the previously stored dynamic covert identifier and at least one new part which is at least partially derived from operational events at the client device which occurred after creation of a previous version of the dynamic covert identifier;
receiving a subsequent message from a client device at the server, the message containing the latest updated version of the dynamic covert identifier;
locating the dynamic covert identifier previously stored at the server for the client device with the same credentials as the client device from which the subsequent message is received;
comparing the previously stored dynamic covert identifier with the original part of the updated version of the dynamic covert identifier received in the subsequent message; and reporting detection of a cloned client device if a match is not found; and saving the latest updated version of the dynamic covert identifier received from the client device at the server.

2. The method of claim 1, wherein the dynamic covert identifier comprises selected covert data values generated by operational events at a client device, and detection of a clone of a real client device is reported if covert data values in a covert identifier received from a client device do not match any covert data values in a version of the covert identifier stored at the server for the client device having the same credentials as the client device from which the message is received.

3. The method of claim 1, wherein the dynamic covert identifier is based on covert data values generated by the client device.

4. The method of claim 2, further comprising periodically changing at least one covert data value to a different covert data value based on a different operational event at a client device.

5. The method of claim 1, wherein the dynamic covert identifier comprises a code based on selected covert data values generated by different operational events at a client device.

6. The method of claim 1, wherein the dynamic covert identifier is at least partially based on at least one token provided by the server to the client device.

7. The method of claim 3, wherein the covert data values are based on the time of sending predetermined messages.

8. The method of claim 1, wherein the dynamic covert identifier is based on covert data generated by the server and provided by the server in a message to the client device.

9. The method of claim 1, wherein the dynamic covert identifier is based on covert data values generated by the client device and the server.

10. The method of claim 1, wherein at least one event trigger comprises installation of updated firmware on a client device.

11. The method of claim 1, wherein at least one event trigger comprises receipt of a predetermined number of a particular type of message from the server.

12. The method of claim 1, wherein at least one event trigger comprises sending a predetermined number of a particular type of message from the client device.

13. The method of claim 1, wherein at least one event trigger comprises a predetermined number of channel changes at the client device.

14. The method of claim 1, wherein at least one event trigger comprises a server issued trigger.

15. The method of claim 1, wherein the dynamic covert identifier is based on the time of day an event occurred in the client device.

16. A method of renewing subscriber client devices on a network, comprising:

creating a dynamic covert identifier which identifies a client device, the dynamic covert identifier being derived from operational events which are at least substantially unique to the operation of said client device;

storing at a server of a service provider the dynamic covert identifier for a client device having credentials registered at a server;

updating at least part of the previously stored dynamic covert identifier periodically at a client device based on event triggers to create an updated version of the dynamic covert identifier which includes at least one original part of the previously stored dynamic covert identifier and at least one new part which is at least partially derived from operational events at the client device which occurred after creation of a previous version of the dynamic covert identifier, and storing the latest updated version of the dynamic covert identifier at the client device;

receiving a service renewal message from the service provider at the client device;

providing the current updated version of the dynamic covert identifier created at the client device to the service provider in a message from the client device over the network in response to the service renewal message;

comparing the dynamic covert identifier previously stored at the server for the client device with the original part of the current updated version of the dynamic covert identifier received in the message from the client device in response to the service renewal message;

if the original part of the updated version of the dynamic cover identifier received in the message from the client device matches the dynamic covert identifier previously stored at the server, sending a renewal code message to the client device over the network, the renewal code message containing a renewal unlock code based on the dynamic covert identifier provided to the service provider; and processing the renewal unlock code using the dynamic covert identifier stored at the client device to receive continued services from the service provider.

17. The method of claim 16, further comprising receiving an update covert identifier message at the client device prior to the service renewal message, and the step of updating at least part of the dynamic covert identifier stored at the client device occurs at least in response to receipt of the update covert identifier message from the server, and is based on operational events subsequent to the events from which the original the previously stored dynamic covert identifier was created.

18. The method of claim 16, wherein the dynamic covert identifier comprises a code based on selected covert data values generated by different operational events at a client device.

19. A system for detecting cloned client devices on a network, comprising:

a server having a communication module which communicates with client devices over a network;

a plurality of client devices communicating with the server over the network;

each client device having a covert identifier generating module which generates a first version of a variable dynamic covert identifier based on operational events at the respective client device which are substantially unique to the respective client device and which periodically generates an updated version of the dynamic covert identifier which includes at least one original part of the previously generated dynamic covert identifier and at least one new part which is at least partially derived from operational events at the respective client device which occurred subsequent to creation of the previous version of the dynamic covert identifier, a covert data storage module which stores covert data values, and a message formatting module which embeds the latest version of the dynamic covert identifier in each message sent from the client device to the server over the network;

a data storage module associated with the server which stores a client identifier associated with at least one real client device registered for service with the server and at least the latest version of the dynamic covert identifier received from a client device having the same client identifier; and a clone detection module associated with the server and data storage module which compares the original part of at least one dynamic covert identifier in a message received from a client device with the original and new parts in the latest version of the dynamic covert identifier stored in the data storage module which is associated with a client device having the same client identifier, and which creates a clone detection report if the original part of the dynamic covert identifier received in the message does not match the latest version of the dynamic covert identifier stored at the server.

20. The system of claim 19, wherein the client devices are smart cards.

21. The system of claim 19, wherein at least some of the client devices include smart cards.

22. The system of claim 19, wherein at least some of the client devices are set top boxes.

23. The system of claim 19, wherein at least some of the client devices are mobile communication devices.

24. The system of claim 19, wherein at least some of the client devices are personal computers.

25. The system of claim 19, wherein each version of the dynamic covert identifier comprises a plurality of covert data values corresponding to different operational events at the respective client device.

26. The system of claim 19, wherein each version of the dynamic covert identifier comprises a transformed version of a plurality of covert data values corresponding to different operational events at the respective client device.

27. A client device for communicating over a network, comprising:
 a communication module which is configured to communicate with a server of at least one service provider over a network;
 a covert identifier generating module which is configured to create a first version of a variable dynamic covert identifier based on at least one variable covert data value of an operational event at the client device which is substantially unique to the client device and which periodically creates an updated version of the dynamic covert identifier which includes at least one original covert data value of the previously created dynamic covert identifier and at least one new covert data value which is derived from operational events at the respective client device which occurred subsequent to creation of the first version of the dynamic covert identifier;
 a data storage module associated with the covert data generating module which stores the latest updated version of the dynamic covert identifier; and
 a message formatting module associated with the communication module and data storage module which embeds the latest version of the dynamic covert identifier in each message sent from the client device to the server over the network; and
 a renewal module which is configured to respond to a renewal message received from the server over the network by sending the current updated dynamic covert identifier in a renewal unlock code request message to the server and to process a renewal unlock code based on the current updated dynamic covert identifier subsequently received from the server using the latest updated dynamic covert identifier stored in the data storage module, whereby the client device continues to receive services from the service provider associated with the server if the renewal unlock code contains a dynamic covert identifier matching the current updated dynamic covert identifier stored in the data storage module.

28. The client device of claim 27, wherein the data storage module stores a covert data table of different covert data values of different operational events which are substantially unique to the client device, and the dynamic covert identifier is based on the covert data table.

29. The client device of claim 28, wherein the dynamic covert identifier comprises at least some of the covert data values in the covert data table.

30. The client device of claim 28, wherein the dynamic covert identifier is a transformation of at least some of the covert data values.

31. The client device of claim 28, further comprising a covert data update module configured to update the table of covert data values with at least some new covert data values in response to at least one predetermined covert data trigger.

32. The client device of claim 27, wherein the dynamic covert identifier generating module is configured to generate an updated version of the dynamic covert identifier based on new covert data values in response to a command received from the server.

33. The client device of claim 32, wherein the command comprises an update command received in a network message.

34. The client device of claim 32, wherein the command comprises a covert data trigger.

35. The client device of claim 27, comprising a smart card having an integral processor containing the communication module, covert identifier generating module, and data storage module.

36. The client device of claim 27, wherein the client device is selected from the group consisting of set top boxes, personal computers, personal digital assistants, portable communication devices, media playing devices, and smart cards.

37. The client device of claim 27, wherein the client device is a silicon chip including a covert identifier generating module and data storage module.

* * * * *